US012785863B2

(12) United States Patent
Li et al.

(10) Patent No.: US 12,785,863 B2
(45) Date of Patent: Nov. 3, 2026

(54) HARQ-ACK TRANSMISSION METHOD AND APPARATUS

(71) Applicant: VIVO MOBILE COMMUNICATION CO., LTD., Dongguan (CN)

(72) Inventors: Na Li, Dongguan (CN); Chaojun Zeng, Dongguan (CN); Lihui Wang, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 214 days.

(21) Appl. No.: 18/424,932

(22) Filed: Jan. 29, 2024

(65) Prior Publication Data

US 2024/0171321 A1 May 23, 2024

Related U.S. Application Data

(63) Continuation of application No. PCT/CN2022/108940, filed on Jul. 29, 2022.

(30) Foreign Application Priority Data

Jul. 30, 2021 (CN) ......................... 202110875678.4

(51) Int. Cl.
*H04L 1/1829* (2023.01)
*H04L 1/1812* (2023.01)
(Continued)

(52) U.S. Cl.
CPC .......... *H04L 1/1854* (2013.01); *H04L 1/1812* (2013.01); *H04L 5/0055* (2013.01); *H04W 72/21* (2023.01); *H04W 72/56* (2023.01)

(58) Field of Classification Search
CPC ... H04L 1/1854; H04L 1/1812; H04L 5/0055; H04L 1/1671; H04L 1/1822; H04L 5/00;
(Continued)

(56) References Cited

U.S. PATENT DOCUMENTS 11,246,155 B2 * 2/2022 Zhang .................. H04L 1/1685
11,956,780 B2 * 4/2024 Lee ...................... H04L 1/1812
(Continued)

FOREIGN PATENT DOCUMENTS

CN 111278172 A 6/2020
CN 113169826 A 7/2021

OTHER PUBLICATIONS

"Discussion on HARQ-ACK enhancements for eURLLC", 3GPP TSG RAN WG1 Meeting #103-e, R1-2008821, e-Meeting, Oct. 26-Nov. 13, 2020, 10 pages.
(Continued)

*Primary Examiner* — Will W Lin
(74) *Attorney, Agent, or Firm* — The Webb Law Firm

(57) ABSTRACT

A HARQ-ACK transmission method includes receiving, by a terminal, scheduling information sent by a network-side device; and in a case that the terminal determines, based on the scheduling information, that a first HARQ-ACK is triggered and that a second HARQ-ACK and the first HARQ-ACK are fed back within a same time unit, feeding back, by the terminal, the first HARQ-ACK and/or the second HARQ-ACK to the network-side device, where the second HARQ-ACK is a first feedback of a HARQ-ACK of one or more PDSCHs and/or PDCCHs, and the first HARQ-ACK includes retransmission of a historical HARQ-ACK.

18 Claims, 6 Drawing Sheets

(51) Int. Cl.
*H04L 5/00* (2006.01)
*H04W 72/21* (2023.01)
*H04W 72/56* (2023.01)

(58) Field of Classification Search
CPC .... H04L 1/1861; H04L 1/1896; H04W 72/21; H04W 72/56; H04W 72/0446; H04W 72/563
See application file for complete search history.

(56) References Cited

U.S. PATENT DOCUMENTS

| | | | | |
|---|---|---|---|---|
| 2019/0306878 | A1 | 10/2019 | Zhang et al. | |
| 2021/0258107 | A1* | 8/2021 | Khoshnevisan | H04L 1/1614 |
| 2021/0410155 | A1* | 12/2021 | Khoshnevisan | H04L 1/1896 |
| 2022/0014343 | A1 | 1/2022 | Liu et al. | |
| 2022/0132537 | A1* | 4/2022 | Wang | H04L 1/0061 |
| 2022/0183032 | A1* | 6/2022 | Papasakellariou | H04L 1/1861 |
| 2022/0416951 | A1 | 12/2022 | Li | |
| 2023/0189298 | A1* | 6/2023 | Lee | H04W 72/30 |
| 2023/0262699 | A1* | 8/2023 | Kusashima | H04L 5/0053 |
| 2024/0056232 | A1* | 2/2024 | Gao | H04L 1/1864 |
| 2024/0080856 | A1* | 3/2024 | Wang | H04L 1/1854 |
| 2024/0154733 | A1* | 5/2024 | Lei | H04L 1/1671 |
| 2024/0430900 | A1* | 12/2024 | El Hamss | H04L 1/1864 |

OTHER PUBLICATIONS

"HARQ-ACK enhancement for IOT and URLLC", 3GPP TSG RAN WG1 #105-e, R1-2104663, e-Meeting, May 10-27, 2021, 21 pages.

"Retransmission of dropped HARQ-ACK for URLLC", 3GPP TSG RAN WG1 #105-e, R1-2105160, e-Meeting, May 10-27, 2021, 3 pages.

Apple Inc., "Views on URLLC HARQ feedback enhancements", 3GPP TSG-RAN WG1 Meeting #105-e, e-Meeting, May 10-27, 2021, R1-2105097.

Asia Pacific Telecom et al., "Discussion on UE feedback enhancements for HARQ-ACK", 3GPP TSG-RAN WG1 Meeting #105-e, e-Meeting, May 10-27, 2021, R1-2105819.

Catt, "Ue feedback enhancements for HARQ-ACK", 3GPP TSG-RAN WG1 #105-e, e-Meeting, May 19-27, 2021, R1-2104512.

Nokia et al., "HARQ-ACK Feedback Enhancements for URLLC/IIoT", 3GPP TSG-RAN WG1 #105-e, e-Meeting, May 19-27, 2021, R1-2104309.

Oppo, "HARQ-ACK enhancements for Rel-17URLLC/IIoT", 3GPP TSG-RAN WG1 #105-e, e-Meeting, May 19-27, 2021, R1-2104802.

Samsung, "HARQ-ACK Reporting Enhancements for URLLC", 3GPP TSG-RAN WG1 #105, e-Meeting, May 19-27, 2021,R1-2105302.

Wilus Inc., "Discussion on HARQ-ACK enhancement for URLL/IIoT", 3GPP TSG RAN WG1 #105-e, e-Meeting, May 10-27, 2021, R1-2105872.

Lenovo et al., "HARQ-ACK feedback enhancement for IIoT/URLLC", 3GPP TSG RAN WG1 #104bis-e, e-Meeting, Apr. 12-20, 2021, R1-2103610.

* cited by examiner

HARQ-ACK TRANSMISSION METHOD AND APPARATUS

CROSS-REFERENCE TO RELATED APPLICATIONS

This application is a Bypass Continuation Application of International Patent Application No. PCT/CN2022/108940 filed Jul. 29, 2022, and claims priority to Chinese Patent Application No. 202110875678.4 filed Jul. 30, 2021, the disclosures of which are hereby incorporated by reference in their entireties.

BACKGROUND OF THE INVENTION

Field of the Invention

This application pertains to the field of communications technologies, and specifically, relates to a HARQ-ACK transmission method and apparatus.

Description of Related Art

A hybrid automatic repeat request acknowledgement (HARQ-ACK) retransmission mechanism is introduced in a communications system, so that historical HARQ-ACK information such as a historically discarded HARQ-ACK can be retransmitted.

In the HARQ-ACK retransmission mechanism, HARQ-ACK retransmission on a physical uplink control channel (PUCCH) resource and/or a physical uplink data channel (PUSCH) resource can be triggered by using downlink control information (DCI). However, how to specifically trigger HARQ-ACK retransmission on the PUCCH/PUSCH resource by using the DCI and how to implement HARQ-ACK retransmission are not clear. As a result, HARQ-ACK retransmission cannot be effectively implemented.

SUMMARY OF THE INVENTION

According to a first aspect, a HARQ-ACK transmission method is provided. The method includes:

receiving, by a terminal, scheduling information sent by a network-side device; and in a case that the terminal determines, based on the scheduling information, that a first HARQ-ACK is triggered and that a second HARQ-ACK and the first HARQ-ACK are fed back within a same time unit, feeding back, by the terminal, the first HARQ-ACK and/or the second HARQ-ACK to the network-side device, where the second HARQ-ACK is a first feedback of a HARQ-ACK of one or more physical downlink shared channels (PDSCH) and/or physical downlink control channels (PDCCH), and the first HARQ-ACK includes retransmission of a historical HARQ-ACK.

According to a second aspect, a HARQ-ACK transmission method is provided. The method includes:

sending, by a network-side device, scheduling information to a terminal, where the scheduling information is used to trigger a first HARQ-ACK, and the first HARQ-ACK includes retransmission of a historical HARQ-ACK; and receiving, by the network-side device, the first HARQ-ACK and/or a second HARQ-ACK, where the first HARQ-ACK and/or the second HARQ-ACK are/is fed back in a case that the terminal determines that the first HARQ-ACK is triggered for retransmission and determines that the second HARQ-ACK and the first HARQ-ACK are fed back within a same time unit, and the second HARQ-ACK is a first feedback of a HARQ-ACK of one or more PDSCHs and/or PDCCHs.

According to a third aspect, a HARQ-ACK transmission apparatus is provided. The apparatus includes:

a first receiving module, configured to receive scheduling information sent by a network-side device; and a first feedback module, configured to: in a case that a terminal determines, based on the scheduling information, that a first HARQ-ACK is triggered and that a second HARQ-ACK and the first HARQ-ACK are fed back within a same time unit, feed back, by the terminal, the first HARQ-ACK and/or the second HARQ-ACK to the network-side device, where the second HARQ-ACK is a first feedback of a HARQ-ACK of one or more PDSCHs and/or PDCCHs, and the first HARQ-ACK includes retransmission of a historical HARQ-ACK.

According to a fourth aspect, a HARQ-ACK transmission apparatus is provided. The apparatus includes:

a first sending module, configured to send scheduling information to a terminal, where the scheduling information is used to trigger a first HARQ-ACK, and the first HARQ-ACK includes retransmission of a historical HARQ-ACK; and a second receiving module, configured to receive the first HARQ-ACK and/or a second HARQ-ACK, where the first HARQ-ACK and/or the second HARQ-ACK are/is fed back in a case that the terminal determines that the first HARQ-ACK is triggered for retransmission and determines that the second HARQ-ACK and the first HARQ-ACK are fed back within a same time unit, and the second HARQ-ACK is a first feedback of a HARQ-ACK of one or more PDSCHs and/or PDCCHs.

According to a fifth aspect, a terminal is provided. The terminal includes a processor, a memory, and a program or instructions stored in the memory and executable on the processor. When the program or instructions are executed by the processor, the steps of the method according to the first aspect are implemented.

According to a sixth aspect, a terminal is provided and includes a processor and a communications interface. The communications interface is configured to:

receive scheduling information sent by a network-side device; and the processor is configured to:

in a case that the terminal determines, based on the scheduling information, that a first HARQ-ACK is triggered and that a second HARQ-ACK and the first HARQ-ACK are fed back within a same time unit, feed back, by the terminal, the first HARQ-ACK and/or the second HARQ-ACK to the network-side device, where the second HARQ-ACK is a first feedback of a HARQ-ACK of one or more PDSCHs and/or PDCCHs, and the first HARQ-ACK includes retransmission of a historical HARQ-ACK.

According to a seventh aspect, a network-side device is provided. The network-side device includes a processor, a memory, and a program or instructions stored in the memory and executable on the processor. When the program or instructions are executed by the processor, the steps of the method according to the first aspect are implemented.

According to an eighth aspect, a network-side device is provided and includes a processor and a communications interface. The communications interface is configured to:

send scheduling information to a terminal, where the scheduling information is used to trigger a first HARQ-ACK, and the first HARQ-ACK includes retransmission of a historical HARQ-ACK; and receive the first HARQ-ACK and/or a second HARQ-ACK, where the first HARQ-ACK and/or the second HARQ-ACK are/is fed back in a case that the terminal determines that the first HARQ-ACK is triggered for retransmission and determines that the second HARQ-ACK and the first HARQ-ACK are fed back within a same time unit, and the second HARQ-ACK is a first feedback of a HARQ-ACK of one or more PDSCHs and/or PDCCHs.

According to a ninth aspect, a non-transitory readable storage medium is provided. The non-transitory readable storage medium stores a program or instructions. When the program or instructions are executed by a processor, the steps of the method according to the first aspect are implemented, or the steps of the method according to the second aspect are implemented.

According to a tenth aspect, a chip is provided. The chip includes a processor and a communications interface. The communications interface is coupled to the processor. The processor is configured to run a program or instructions to implement the steps of the method according to the first aspect or implement the steps of the method according to the second aspect.

According to an eleventh aspect, a computer program or program product is provided. The computer program or program product is stored in a non-transitory storage medium. The program or program product is executed by at least one processor to implement the steps of the method according to the first aspect or implement the steps of the method according to the second aspect.

DESCRIPTION OF THE INVENTION

The following clearly describes the technical solutions in the embodiments of this application with reference to the accompanying drawings in the embodiments of this application. Apparently, the described embodiments are only some rather than all of the embodiments of this application. All other embodiments obtained by a person of ordinary skill in the art based on the embodiments of this application shall fall within the protection scope of this application.

The terms “first”, “second”, and the like in this specification and claims of this application are used to distinguish between similar objects instead of describing a specific order or sequence. It should be understood that the terms used in this way are interchangeable in appropriate circumstances, so that the embodiments of this application can be implemented in other orders than the order illustrated or described herein. In addition, objects distinguished by “first” and “second” usually fall within one class, and a quantity of objects is not limited. For example, there may be one or more first objects. In addition, the term “and/or” in the specification and claims indicates at least one of connected objects, and the character “/” generally represents an “or” relationship between associated objects.

It should be noted that technologies described in the embodiments of this application are not limited to a long term evolution (LTE)/LTE-Advanced (LTE-A) system, and can also be used in other wireless communications systems, such as code division multiple access (CDMA), time division multiple access (TDMA), frequency division multiple access (FDMA), orthogonal frequency division multiple access (OFDMA), single-carrier frequency-division multiple access (SC-FDMA), and other systems. The terms “system” and “network” in the embodiments of this application are usually used interchangeably. The described technologies may be used for the foregoing systems and radio technologies, and may also be used for other systems and radio technologies. In the following descriptions, a new radio (NR) system is described for an illustrative purpose, and NR terms are used in most of the following descriptions. However, these technologies may also be applied to other communications systems than an NR system application, for example, a 6th Generation (6G) communications system.

Figure 1:
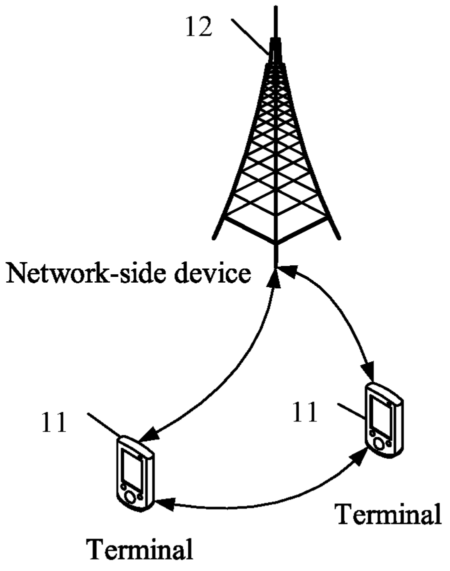
FIG. 1 is a structural diagram of a wireless communications system to which an embodiment of this application may be applied.

FIG. 1 is a structural diagram of a wireless communications system to which an embodiment of this application may be applied. The wireless communications system includes a terminal 11 and a network-side device 12. The terminal 11 may also be referred to as a terminal device or user equipment (UE). The terminal 11 may be a terminal-side device such as a mobile phone, a tablet personal computer, a laptop computer or a notebook computer, a personal digital assistant (PDA), a palmtop computer, a netbook, an ultra-mobile personal computer (UMPC), a mobile Internet device (MID), an augmented reality (AR) or virtual reality (VR) device, a robot, a wearable device, a vehicular user equipment (VUE), a pedestrian user equipment (PUE), or a smart home (a home device having a wireless communication function, such as a refrigerator, a television, a washing machine, or furniture). The wearable device includes a smartwatch, a smart band, a smart headphone, smart glasses, smart jewelry (a smart bracelet, a smart wrist chain, a smart ring, a smart necklace, a smart anklet, a smart ankle chain, or the like), a smart wristband, smart clothing, a game console, or the like. It should be noted that a specific type of the terminal 11 is not limited in the embodiments of this application. The network-side device 12 may be a base station or a core network device. The base station may be referred to as a NodeB, an evolved NodeB (eNB), an access point, a base transceiver station (BTS), a radio base station, a radio transceiver, a basic service set (BSS), an extended service set (ESS), a home NodeB, a home evolved NodeB, a WLAN access point, a Wi-Fi node, a transmission and reception point (TRP), or another appropriate term in the art, as long as the same technical effect is achieved. The base station is not limited to specific technical terms. It should be noted that in the embodiments of this application, only a base station in an NR system is used as an example, but a specific type of the base station is not limited.

A HARQ-ACK transmission method and apparatus, a terminal, a network-side device, and a storage medium provided in embodiments of this application are hereinafter described in detail by using some embodiments and application scenarios thereof with reference to the accompanying drawings.

A future mobile communications system needs to adapt to diverse scenarios and service requirements. Scenarios such as enhanced mobile broadband (eMBB), massive machine type communication (mMTC), and ultra-reliable and low-latency communication (URLLC) pose requirements on high reliability, low latency, large bandwidth, wide coverage, and the like of the system.

These different services have different quality of service (QoS) requirements. For example, URLLC supports low-latency and high-reliability services. To achieve higher reliability, data needs to be transmitted at a lower bit rate, and a faster and more accurate feedback of channel state information (CSI) is required. An eMBB service supports a high throughput requirement, but is less sensitive to latency and reliability as URLLC. In addition, some UEs may support services with different numerologies (numerology). UE supports not only a URLLC low-latency and high-reliability service, but also a large-capacity and high-rate eMBB service.

For a HARQ-ACK process supporting a TB-level feedback, each transport block (TB) corresponds to a feedback of one HARQ-ACK bit. A plurality of downlink (DL) DL HARQ processes of each UE are supported, and a single DL HARQ process of each UE is also supported. The UE needs to indicate its minimum HARQ processing time capability (the minimum HARQ processing time means a minimum time required from receiving downlink data to a corresponding HARQ-ACK transmission timing). Asynchronous and adaptive downlink HARQs are supported for eMBB and URLLC. From a perspective of the UE, a HARQ-ACK feedback of a plurality of PDSCHs may be transmitted in one UL data/control region in time, forming a HARQ-ACK codebook on this uplink (UL). A timing between PDSCH reception and a corresponding ACK/NACK is specified in DCI (refer to a PDSCH-to-HARQ-timing indicator in DCI 1_0 and DCI 1_1).

In a communications system, two types of HARQ-ACK codebooks are supported: type 1: a semi-static HARQ-ACK codebook, and type 2: a dynamic HARQ-ACK codebook. For the semi-static HARQ-ACK codebook, UE may determine, based on parameters such as a PDCCH monitoring occasion (PDCCH monitoring occasion) configured via RRC, PDSCH time domain resource allocation (PDSCH-TimeDomainResourceAllocation), and PDSCH to HARQ-ACK feedback timing (dl-DataToUL-ACK or PDSCH-to-HARQ-timing), HARQ-ACK codebooks of all PDSCHs that may be fed back in a slot. Because HARQ-ACKs of actually scheduled and unscheduled PDSCHs may be included, the HARQ-ACK codebooks are generally large. For the dynamic HARQ-ACK codebook, the UE may determine the HARQ-ACK codebook based on an actually scheduled PDSCH. Because there is only a feedback about the actually scheduled PDSCH, a size of the HARQ-ACK codebook of the PDSCH is usually smaller than that of the semi-static HARQ-ACK codebook. A specific type of codebook used by the UE is determined through an RRC configuration.

In a communications system, two types of HARQ-ACK codebooks are introduced: enhanced type 2: an enhanced dynamic codebook, and type 3: a one-shot HARQ-ACK codebook. For the enhanced type 2 codebook, scheduled PDSCHs are classified into two PDSCH groups, a HARQ-ACK of each PDSCH group is fed back on one PUCCH, and a HARQ-ACK of at least one PDSCH group is transmitted on one PUCCH. For the type 3 codebook, UE may feed back HARQ-ACK information corresponding to all HARQ processes of all serving cells at a time (if the UE is configured to feed back an NDI, an NDI corresponding to each HARQ process is also included).

To retransmit discarded HARQ-ACK information, a HARQ-ACK retransmission mechanism may be introduced, where HARQ-ACK retransmission can be performed by enhancing the type 3 codebook, that is, triggering a HARQ-ACK codebook corresponding to a specific HARQ process, or triggering the UE to send a HARQ-ACK transmitted on at least one PUCCH/PUSCH/time unit.

In addition, in the communications system, to reduce a peak to average power ratio (PAPR), the UE can transmit only one physical uplink control channel (PUCCH) or physical uplink shared channel (PUSCH) at a time. Therefore, in a PUCCH group, when time domain resources overlap between PUCCHs or between a PUCCH and a PUSCH, the UE needs to resolve a problem of time domain resource overlapping between the PUCCHs or between the PUCCH and the PUSCH, that is, a problem of collision between the PUCCHs or between the PUCCH and the PUSCH. For example, when priorities are the same, uplink control information (UCI) of different PUCCHs is multiplexed, or UCI carried by the PUCCH is multiplexed on the PUSCH for transmission. When priorities are different, transmission of a low-priority PUCCH/PUSCH is canceled and only a high-priority PUCCH/PUSCH is transmitted.

Figure 2:
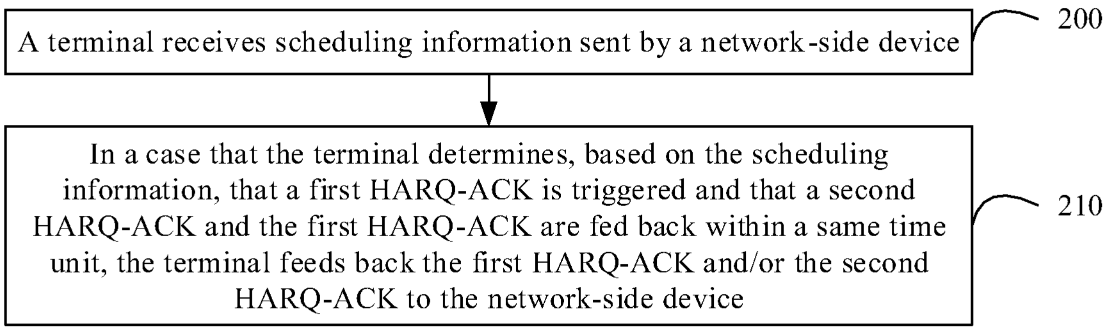
FIG. 2 is a first schematic flowchart of a HARQ-ACK transmission method according to an embodiment of this application.

FIG. 2 is a first schematic flowchart of a HARQ-ACK transmission method according to an embodiment of this application. As shown in FIG. 2, the method includes the following steps.

Step 200: A terminal receives scheduling information sent by a network-side device.

Step 210: In a case that the terminal determines, based on the scheduling information, that a first HARQ-ACK is triggered and that a second HARQ-ACK and the first HARQ-ACK are fed back within a same time unit, the terminal feeds back the first HARQ-ACK and/or the second HARQ-ACK to the network-side device, where the second HARQ-ACK is a first feedback of a HARQ-ACK of one or more PDSCHs and/or PDCCHs, and the first HARQ-ACK includes retransmission of a historical HARQ-ACK.

Specifically, an enhanced type 3 codebook with a smaller codebook size may be supported, or retransmission of a HARQ-ACK on a PUCCH/PUSCH resource or time unit may be triggered by downlink control information (DCI), so that HARQ-ACK information previously discarded or unsuccessfully transmitted can be retransmitted, while a size of the codebook is reduced. The enhanced type 3 codebook may include HARQ-ACK information corresponding to some serving cells or some HARQ processes. In this embodiment of this application, HARQ-ACK retransmission can be triggered and implemented.

Optionally, the terminal may receive the scheduling information sent by the network-side device, determine, based on the scheduling information, that the first HARQ-ACK is triggered and that the second HARQ-ACK and the first HARQ-ACK are fed back within the same time unit.

Optionally, the scheduling information may be one or more pieces of DCI, that is, the first HARQ-ACK and the second HARQ-ACK may be scheduled based on the same DCI or based on different DCI.

Optionally, within a time unit, the terminal may determine that a feedback of a new HARQ-ACK (that is, the second HARQ-ACK) is scheduled and retransmission of a historical HARQ-ACK is triggered. In this case, the terminal may feed back the first HARQ-ACK and/or the second HARQ-ACK to the network-side device. For example, the terminal feeds back only the first HARQ-ACK, or feeds back both the first HARQ-ACK and the second HARQ-ACK.

Optionally, the new HARQ-ACK scheduled for the terminal may be a specific HARQ-ACK for transmission during PDSCH/PDCCH scheduling, which is also a HARQ-ACK scheduled for transmission for the first time.

Optionally, the first HARQ-ACK may be HARQ-ACK retransmission of the historical HARQ-ACK.

Optionally, the historical HARQ-ACK may include at least one piece of HARQ-ACK information, which is scheduled for transmission in a previous PUCCH, PUSCH, or time unit, where the terminal may or may not have transmitted the HARQ-ACK before.

Optionally, the historical HARQ-ACK may be a HARQ-ACK historically scheduled for transmission or discarded within a time unit or some time units.

Optionally, the second HARQ-ACK may be a HARQ-ACK corresponding to a PDSCH scheduled, activated, or deactivated by a piece of DCI, or a HARQ-ACK corresponding to a piece of DCI, and the DCI may be DCI triggering retransmission of the historical HARQ-ACK, or may be DCI different from DCI triggering retransmission of the historical HARQ-ACK.

For example, the terminal receives a piece of DCI, where the DCI schedules a PDSCH or the DCI is used to activate or deactivate an SPS PDSCH, and the DCI also triggers retransmission of the historical HARQ-ACK.

For example, the terminal receives a piece of DCI that triggers retransmission of the historical HARQ-ACK, and the terminal is also scheduled/configured with a feedback of one or more PDSCHs and HARQ-ACK retransmission within a same time unit.

Figure 3:
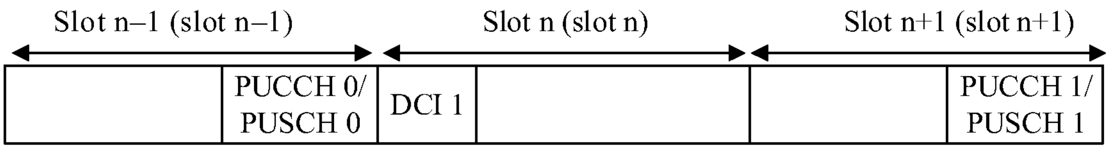
FIG. 3 is a first schematic diagram of a method in which DCI triggers a terminal to resend a HARQ-ACK according to an embodiment of this application.

FIG. 3 is a first schematic diagram of a method in which DCI triggers the terminal to resend a HARQ-ACK according to an embodiment of this application. As shown in FIG. 3, in slot n−1, PUCCH 0 or PUSCH 0 carries HARQ-ACK information. Due to some reasons, PUCCH 0 or PUSCH 0 fails to be successfully sent or fails to be successfully received by a base station. In slot n, the base station may send DCI 1 to trigger the terminal to resend the HARQ-ACK information on PUCCH 0 or PUSCH 0.

The following cases may be included: If DCI 1 is downlink allocation DCI, such as DCI format 1_0, DCI format 1_1, or DCI format 1_2, a time unit that triggers the terminal to resend is indicated by k1 (that is, a HARQ-ACK feedback timing indication) in the DCI, that is, the terminal may be triggered to re-feed back a HARQ-ACK in slot n+k1 (n is a time for receiving the DCI).

If DCI 1 is uplink allocation DCI, such as DCI format 0_0, DCI format 0_1, or DCI format 0_2, a time unit that may trigger the terminal to resend is indicated by k2 (that is, a DCI to PUSCH transmission timing indication during PUSCH scheduling) in the DCI, that is, the terminal is triggered to re-feed back a HARQ-ACK in slot n+k2 (n is a time for receiving the DCI).

A resource for resending the HARQ-ACK may be a PUCCH or a PUSCH. The PUCCH or PUSCH may be the same as or different from the previous PUCCH or PUSCH. In this embodiment of this application, a resource determining manner is not limited.

Optionally, when the DCI triggers the terminal to resend the HARQ-ACK, the base station may further configure several codebook indexes or states by using higher layer signaling. Each codebook index or state corresponds to a HARQ process and/or serving cell. During triggering, the base station indicates which codebook index or state is triggered. In this case, the terminal may feed back corresponding HARQ-ACK information based on a corresponding HARQ process (in this case, the HARQ-ACK retransmission may be all HARQ-ACK information that has not been transmitted, that is, newly transmitted HARQ-ACKs, which may be collectively referred to as HARQ-ACK retransmission).

In this embodiment of this application, if the terminal determines, based on the scheduling information, that retransmission of the historical HARQ-ACK is triggered, and determines that the scheduled second HARQ-ACK of the one or more PDSCHs and/or PDCCHs and the scheduled first HARQ-ACK are fed back within the same time unit, the terminal feeds back the first HARQ-ACK and/or the second HARQ-ACK to the network-side device. Therefore, HARQ-ACK retransmission on a PUCCH resource can be triggered and implemented, it can be ensured that HARQ-ACK retransmission can be effectively implemented, and effectiveness of a communications system can be improved.

Optionally, that the terminal feeds back the first HARQ-ACK and/or the second HARQ-ACK to the network-side device includes:

determining a first target PUCCH for transmitting the first HARQ-ACK and/or the second HARQ-ACK.

Optionally, the first target PUCCH for transmitting the first HARQ-ACK and/or the second HARQ-ACK may be first determined.

Optionally, the first target PUCCH may include only one PUCCH.

Optionally, the first target PUCCH may include a plurality of PUCCHs, for example, may include two PUCCHs.

Optionally, in a case that the first target PUCCH includes a first PUCCH, the first PUCCH is used to feed back at least one of the first HARQ-ACK or the second HARQ-ACK; and that the terminal feeds back the first HARQ-ACK and/or the second HARQ-ACK to the network-side device includes at least one of the following:

the terminal concatenates the first HARQ-ACK and the second HARQ-ACK, and the terminal sends the first PUCCH to the network-side device, where the first PUCCH includes the concatenated first HARQ-ACK and second HARQ-ACK;

in a case that a first HARQ process includes a second HARQ process, the terminal sends the first PUCCH to the network-side device, where the first PUCCH includes only the first HARQ-ACK, the first HARQ process is a HARQ process corresponding to the first HARQ-ACK, and the second HARQ process is a HARQ process corresponding to the second HARQ-ACK; or the terminal sends the first PUCCH to the network-side device only in a case that the first HARQ process includes the second HARQ process.

Optionally, the first target PUCCH may include only one PUCCH, that is, the first PUCCH.

Optionally, the first PUCCH may be used to feed back at least one of the first HARQ-ACK or the second HARQ-ACK.

Optionally, the first PUCCH may be used to feed back the first HARQ-ACK and the second HARQ-ACK.

Optionally, when the terminal transmits the first HARQ-ACK and/or the second HARQ-ACK on the first PUCCH, the transmission may be implemented by at least one of the following (i) to (iii):

(i) The terminal may concatenate the first HARQ-ACK for retransmitting the historical HARQ-ACK and the second HARQ-ACK transmitted for the first time, and then send the first PUCCH to the network-side device, where the first PUCCH includes the concatenated first HARQ-ACK and second HARQ-ACK.

For example, the second HARQ-ACK of a PDSCH scheduled or activated by a piece of DCI is placed after or before the first HARQ-ACK.

For example, the second HARQ-ACK corresponding to a piece of DCI is placed after or before the first HARQ-ACK.

(ii) The terminal may send the first PUCCH to the network-side device in a case that the first HARQ process corresponding to the first HARQ-ACK includes the second HARQ process corresponding to the second HARQ-ACK, where the first PUCCH includes only the first HARQ-ACK, that is, the terminal may feed back only the first HARQ-ACK.

For example, the first HARQ-ACK is HARQ-ACK information corresponding to a specific HARQ process, that is, the enhanced type 3 codebook.

Optionally, the terminal may refer to (i) for execution in a case that the first HARQ process corresponding to the first HARQ-ACK does not include the second HARQ process corresponding to the second HARQ-ACK.

(iii) The terminal may send the first PUCCH to the network-side device only in a case that the first HARQ process includes the second HARQ process.

For example, the terminal may expect that the first HARQ process corresponding to the first HARQ-ACK includes the second HARQ process corresponding to the second HARQ-ACK. Otherwise, it is an error scenario. For example, the terminal may expect that the first HARQ-ACK is HARQ-ACK information corresponding to a specific HARQ process, that is, a scenario of the enhanced type 3 codebook. In other scenarios, the first HARQ-ACK does not need to be transmitted.

Optionally, a corresponding HARQ process when DCI deactivates semi-persistent scheduling (SPS) PDSCH may be determined or predefined in a predefined manner. For example, the HARQ process may be a HARQ process corresponding to an SPS PDSCH that the HARQ process releases in a next cycle.

Optionally, the first target PUCCH includes a second PUCCH and a third PUCCH, where the second PUCCH is used to feed back the first HARQ-ACK, and the third PUCCH is used to feed back the second HARQ-ACK.

Optionally, the first target PUCCH may include two PUCCHs, that is the second PUCCH and the third PUCCH.

Optionally, the second PUCCH may be used to feed back the first HARQ-ACK.

Optionally, the third PUCCH may be used to feed back the second HARQ-ACK.

Optionally, in a case that the second PUCCH and the third PUCCH have at least one of the following: a same priority, same transmission parameter information, or overlapping transmission resources, that the terminal feeds the first HARQ-ACK and/or the second HARQ-ACK to the network-side device includes:

the terminal multiplexes the first HARQ-ACK and the second HARQ-ACK on one PUCCH.

Optionally, when the second PUCCH and the third PUCCH have the same priority, the terminal may multiplex the HARQ-ACKs carried by the two PUCCHs, that is, the first HARQ-ACK and the second HARQ-ACK, on one PUCCH.

Optionally, when the second PUCCH and the third PUCCH have the same transmission parameter information, the terminal may multiplex the HARQ-ACKs carried by the two PUCCHs, that is, the first HARQ-ACK and the second HARQ-ACK, on one PUCCH.

Optionally, when the second PUCCH and the third PUCCH have overlapping transmission resources, the terminal may multiplex the HARQ-ACKs carried by the two PUCCHs, that is, the first HARQ-ACK and the second HARQ-ACK, on one PUCCH.

Optionally, after the first HARQ-ACK and the second HARQ-ACK are multiplexed on one PUCCH, the first HARQ-ACK and/or the second HARQ-ACK may be fed back to the network-side device with reference to a feedback manner in which the first target PUCCH includes only the first PUCCH.

Optionally, the first HARQ-ACK is retransmission of the historical HARQ-ACK before the terminal feeds back the first HARQ-ACK and/or the second HARQ-ACK to the network-side device.

Optionally, the historical HARQ-ACK may be a HARQ-ACK transmitted or discarded before the terminal feeds back the first HARQ-ACK and/or the second HARQ-ACK to the network-side device.

Optionally, the first HARQ-ACK may be retransmission of a historical HARQ-ACK transmitted or discarded within a time unit or some time units.

Optionally, the scheduling information includes a first information field, and the first information field is used to instruct to trigger retransmission of the historical HARQ-ACK corresponding to a target priority.

Optionally, the terminal may receive the scheduling information sent by the network-side device, and then may determine, from the first information field, that a historical HARQ-ACK corresponding to a priority (that is, the target priority) is scheduled for retransmission.

For example, the first information field may instruct to trigger retransmission of a historical HARQ-ACK with a low priority among historical HARQ-ACKs. In this case, the historical HARQ-ACK with the low priority among the historical HARQ-ACKs may be used as the first HARQ-ACK.

Optionally, a priority of the first HARQ-ACK is determined according to a predefined rule.

Specifically, when the DCI triggers retransmission of the historical HARQ-ACK on a PUCCH resource, a problem of determining a priority for retransmission is also unclear.

Optionally, the terminal may determine the priority of the first HARQ-ACK according to the predefined rule. For example, the terminal determines, according to the predefined rule, that the priority of the first HARQ-ACK is the same as that of the historical HARQ-ACK. For example, the predefined rule may directly specify that the priority of the first HARQ-ACK is a high priority or low priority.

Optionally, the scheduling information includes a second information field, and the second information field is used to indicate a priority of the first HARQ-ACK.

Optionally, the priority of the first HARQ-ACK may also be determined based on the scheduling information.

Optionally, the scheduling information may include the second information field, and the second information field is used to indicate the priority of the first HARQ-ACK.

Optionally, the terminal may receive the scheduling information sent by the network-side device, and then may determine the priority of the first HARQ-ACK from the second information field.

Optionally, in a case that the scheduling information includes the second information field and does not include the first information field, the target priority is determined according to a predefined rule.

Optionally, the scheduling information may include only the second information field, and the second information field is used to indicate the priority of the first HARQ-ACK. In this case, the terminal may determine, according to the predefined rule, that a historical HARQ-ACK corresponding to a target priority among the historical HARQ-ACKs needs to be retransmitted.

For example, the terminal may determine, according to the predefined rule, that a historical HARQ-ACK corresponding to a high priority among the historical HARQ-ACKs needs to be retransmitted, and determine, based on a second indication field, that the priority of the first HARQ-ACK is a high priority.

For example, the terminal may determine, according to the predefined rule, that a historical HARQ-ACK corresponding to a low priority among the historical HARQ-ACKs needs to be retransmitted, and determine, based on a second indication field, that the priority of the first HARQ-ACK is a high priority.

For example, the terminal may determine, according to the predefined rule, that a historical HARQ-ACK corresponding to a low priority among the historical HARQ-ACKs needs to be retransmitted, and determine, based on a second indication field, that the priority of the first HARQ-ACK is a low priority.

For example, the terminal may determine, according to the predefined rule, that a historical HARQ-ACK corresponding to a high priority among the historical HARQ-ACKs needs to be retransmitted, and determine, based on a second indication field, that the priority of the first HARQ-ACK is a low priority.

Optionally, the scheduling information may further include both a first information field and a second information field. For example, the first information field instructs to trigger retransmission of a historical HARQ-ACK corresponding to a high priority, and the second information field indicates that the priority of the first HARQ-ACK is a high priority.

Optionally, the scheduling information may further include both a first information field and a second information field. For example, the first information field instructs to trigger retransmission of a historical HARQ-ACK corresponding to a low priority, and the second information field indicates that the priority of the first HARQ-ACK is a high priority.

Optionally, the scheduling information may further include both a first information field and a second information field. For example, the first information field instructs to trigger retransmission of a historical HARQ-ACK corresponding to a high priority, and the second information field indicates that the priority of the first HARQ-ACK is a low priority.

Optionally, the scheduling information may further include both a first information field and a second information field. For example, the first information field instructs to trigger retransmission of a historical HARQ-ACK corresponding to a low priority, and the second information field indicates that the priority of the first HARQ-ACK is a low priority.

Optionally, in a case that the first information field and the second information field are the same, the priority of the first HARQ-ACK and the target priority are the same.

Optionally, in a case that the first information field and the second information field are the same, when determining the priority of the first HARQ-ACK, the terminal may determine that the priority of the first HARQ-ACK is the target priority.

Optionally, in a case that the first information field and the second information field are the same, the priority of the first HARQ-ACK and the target priority are different.

Optionally, in a case that the first information field and the second information field are the same, when determining the priority of the first HARQ-ACK, the terminal may determine that the priority of the first HARQ-ACK is a priority different from the target priority.

Optionally, the scheduling information includes a third information field, and the third information field is used to instruct to trigger retransmission of a historical HARQ-ACK corresponding to a second target PUCCH.

Optionally, the scheduling information may include the third information field, and the third information field is used to instruct to trigger retransmission of the historical HARQ-ACK corresponding to the second target PUCCH.

Optionally, the terminal may receive the scheduling information sent by the network-side device, and determine, based on the third information field in the scheduling information, to retransmit a historical HARQ-ACK corresponding to a PUCCH or some PUCCHs (second target PUCCHs).

Optionally, if the terminal determines that the historical HARQ-ACK corresponding to the second target PUCCH needs to be retransmitted, the terminal may determine to use the historical HARQ-ACK corresponding to the second target PUCCH as the first HARQ-ACK.

Optionally, the scheduling information includes a fourth information field, and the fourth information field is used to indicate a priority of the first HARQ-ACK.

Optionally, the scheduling information may include the fourth information field, and the fourth information field is used to indicate the priority of the first HARQ-ACK.

Optionally, the terminal may receive the scheduling information sent by the network-side device, and determine the priority of the first HARQ-ACK based on the fourth information field in the scheduling information.

Optionally, the scheduling information may include the third information field and the fourth information field, and the terminal may determine, based on the third information field, to retransmit the historical HARQ-ACK corresponding to the second target PUCCH, that is, the first HARQ-ACK is determined, and the terminal may further determine the priority of the first HARQ-ACK based on the fourth information field.

Optionally, in a case that the second target PUCCH corresponds to only one priority, a priority of a first target PUCCH and a priority of the second target PUCCH are the same.

Optionally, in a case that the second target PUCCH corresponds to only one priority, the priority of the first target PUCCH and the priority of the second target PUCCH may be the same.

Optionally, the priority of the first target PUCCH may be considered as a priority of a PUCCH for transmitting the first HARQ-ACK and/or the second HARQ-ACK.

Optionally, a priority of each PUCCH may be determined based on the priority of the HARQ-ACK carried by the PUCCH.

Optionally, in a case that the second target PUCCH corresponds to only one priority, the scheduling information includes a fifth information field, and the fifth information field is used to indicate at least one of the following:

a priority of a first target PUCCH;

a priority of the first HARQ-ACK, where the priority of the first HARQ-ACK is used to determine the priority of the first target PUCCH; or a priority of the second target PUCCH.

Optionally, in a case that the second target PUCCH corresponds to only one priority, the scheduling information may include the fifth information field, and the fifth information field may indicate both the priority of the first target PUCCH and the priority of the second target PUCCH. In other words, the terminal may determine the first HARQ-ACK based on the priority of the second target PUCCH. For example, if the priority of the second target PUCCH is a high priority, the terminal may determine that the first HARQ-ACK is retransmission of a historical HARQ-ACK with a high priority.

Optionally, in a case that the second target PUCCH corresponds to at least two priorities, a priority of a first target PUCCH is determined according to a predefined rule.

Optionally, in a case that the second target PUCCH corresponds to at least two priorities, the terminal may determine the priority of the first target PUCCH according to the predefined rule.

For example, the scheduling information may indicate that the second target PUCCH corresponds to a high priority and a low priority. In this case, it may be determined, according to the predefined rule, that the priority of the first target PUCCH is a higher priority among the priorities corresponding to the second target PUCCH.

For example, the scheduling information may indicate that the second target PUCCH corresponds to a high priority and a low priority. In this case, it may be determined, according to the predefined rule, that the priority of the first target PUCCH is a high priority.

Optionally, a priority of a first target PUCCH is determined based on an indication from the network-side device, determined according to a predefined rule, or determined based on a higher layer configuration.

Optionally, the priority of the first target PUCCH may be directly indicated by the network-side device to the terminal by using indication information, or may be determined by the terminal directly according to the predefined rule, or may be a priority configured by a higher layer.

Optionally, transmission parameter information of a first target PUCCH and transmission parameter information of a fourth PUCCH are the same; and the transmission parameter information includes at least one of the following:

a PUCCH resource index;

start and end positions of transmission;

a symbol length; or transmit power.

Optionally, the fourth PUCCH is a corresponding PUCCH when the historical HARQ-ACK triggered for retransmission is transmitted or discarded.

Optionally, the transmission parameter information of the first target PUCCH and the transmission parameter information of the fourth PUCCH may be the same.

For example, the PUCCH resource index of the first target PUCCH and the PUCCH resource index of the fourth PUCCH may be the same.

For example, the start position, end position, and format of the transmission of the first target PUCCH may be the same as the start position, end position, and format of the transmission of the fourth PUCCH.

For example, the symbol length of the first target PUCCH and the symbol length of the fourth PUCCH may be the same.

For example, the transmit power of the first target PUCCH and the transmit power of the fourth PUCCH may be the same.

For example, the symbol length and transmit power of the first target PUCCH may be both the same as the symbol length and transmit power of the fourth PUCCH.

Optionally, the method further includes:

in a case that the first HARQ-ACK is scheduled for the terminal but the second HARQ-ACK that needs to be fed back does not exist or the historical HARQ-ACK does not exist, performing any one of the following:

not feeding back the first HARQ-ACK to the network-side device; and transmitting a default codebook (default codebook) to the network-side device.

Optionally, if the first HARQ-ACK is scheduled for the terminal, that is, when retransmission of a HARQ-ACK carried by a PUCCH transmitted/discarded within a time unit or some time units is scheduled, if the terminal does not receive DCI, or no SPS PDSCH has a HARQ-ACK to be fed back within the time unit or time units, or there is no PUCCH carrying a HARQ-ACK within the time unit or time units, or there is no discarded PUCCH carrying a HARQ-ACK within the time unit or time units, at least one of the following may be performed:

(i) the terminal does not feed back the first HARQ-ACK to the network-side device, and ignores the scheduling information; or (ii) the terminal transmits the default codebook to the network-side device.

Optionally, the terminal may transmit the default codebook on a specific PUCCH. The specific PUCCH may be a PUCCH configured in a predefined manner or configured by a higher layer to transmit the default codebook.

In this embodiment of this application, if the terminal determines, based on the scheduling information, that retransmission of the historical HARQ-ACK is triggered, and determines that the scheduled second HARQ-ACK of the one or more PDSCHs and/or PDCCHs and the scheduled first HARQ-ACK are fed back within the same time unit, the terminal feeds back the first HARQ-ACK and/or the second HARQ-ACK to the network-side device. Therefore, HARQ-ACK retransmission on a PUCCH resource can be triggered and implemented, it can be ensured that HARQ-ACK retransmission can be effectively implemented, and effectiveness of a communications system can be improved.

Figure 4:
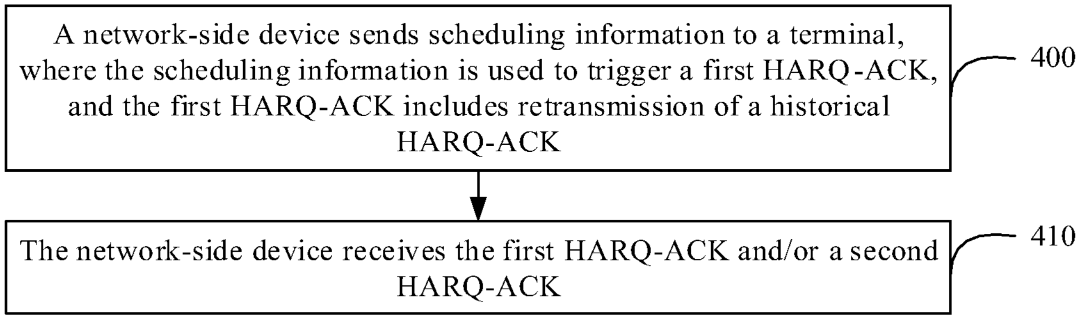
FIG. 4 is a second schematic flowchart of a HARQ-ACK transmission method according to an embodiment of this application.

FIG. 4 is a second schematic flowchart of a HARQ-ACK transmission method according to an embodiment of this application. As shown in FIG. 4, the method includes the following steps.

Step 400: A network-side device sends scheduling information to a terminal, where the scheduling information is used to trigger a first HARQ-ACK, and the first HARQ-ACK includes retransmission of a historical HARQ-ACK.

Step 410: The network-side device receives the first HARQ-ACK and/or a second HARQ-ACK, where the first HARQ-ACK and/or the second HARQ-ACK are/is fed back in a case that the terminal determines that the first HARQ-ACK is triggered for retransmission and determines that the second HARQ-ACK and the first HARQ-ACK are fed back within a same time unit, and the second HARQ-ACK is a first feedback of a HARQ-ACK of one or more PDSCHs and/or PDCCHs.

Specifically, an enhanced type 3 codebook with a smaller codebook size may be supported, or retransmission of a HARQ-ACK on a PUCCH/PUSCH resource or time unit may be triggered by DCI, so that HARQ-ACK information previously discarded or unsuccessfully transmitted can be retransmitted, while a size of the codebook is reduced. The enhanced type 3 codebook may include HARQ-ACK information corresponding to some serving cells or some HARQ processes. In this embodiment of this application, HARQ-ACK retransmission can be triggered and implemented.

Optionally, the network-side device may send the scheduling information to the terminal, so that the terminal determines, based on the scheduling information, that the first HARQ-ACK is triggered and that the second HARQ-ACK and the first HARQ-ACK are fed back within the same time unit.

Optionally, the scheduling information may be one or more pieces of DCI, that is, the first HARQ-ACK and the second HARQ-ACK may be scheduled based on the same DCI or based on different DCI.

Optionally, within a time unit, the terminal may determine that a feedback of a new HARQ-ACK (that is, the second HARQ-ACK) is scheduled and retransmission of a historical HARQ-ACK is triggered. In this case, the terminal may feed back the first HARQ-ACK and/or the second HARQ-ACK to the network-side device. For example, the terminal feeds back only the first HARQ-ACK, or feeds back both the first HARQ-ACK and the second HARQ-ACK.

Optionally, the new HARQ-ACK scheduled for the terminal may be a specific HARQ-ACK for transmission during PDSCH/PDCCH scheduling, which is also a HARQ-ACK scheduled for transmission for the first time.

Optionally, the first HARQ-ACK may be HARQ-ACK retransmission of the historical HARQ-ACK.

Optionally, the historical HARQ-ACK may include at least one piece of HARQ-ACK information, which is scheduled for transmission in a previous PUCCH, PUSCH, or time unit, where the terminal may or may not have transmitted the HARQ-ACK before.

Optionally, the historical HARQ-ACK may be a HARQ-ACK historically scheduled for transmission or discarded within a time unit or some time units.

Optionally, the second HARQ-ACK may be a HARQ-ACK corresponding to a PDSCH scheduled, activated, or deactivated by a piece of DCI, or a HARQ-ACK corresponding to a piece of DCI, and the DCI may be DCI triggering retransmission of the historical HARQ-ACK, or may be DCI different from DCI triggering retransmission of the historical HARQ-ACK.

For example, the terminal receives a piece of DCI, where the DCI schedules a PDSCH or the DCI is used to activate or deactivate an SPS PDSCH, and the DCI also triggers retransmission of the historical HARQ-ACK.

For example, the terminal receives a piece of DCI that triggers retransmission of the historical HARQ-ACK, and the terminal is also scheduled/configured with a feedback of one or more PDSCHs and HARQ-ACK retransmission within a same time unit.

As shown in FIG. 3, in slot n−1, PUCCH 0 or PUSCH 0 carries HARQ-ACK information. Due to some reasons, PUCCH 0 or PUSCH 0 fails to be successfully sent or fails to be successfully received by a base station. In slot n, the base station may send DCI 1 to trigger the terminal to resend the HARQ-ACK information on PUCCH 0 or PUSCH 0.

The following cases may be included: If DCI 1 is downlink allocation DCI, such as DCI format 1_0, DCI format 1_1, or DCI format 1_2, a time unit that triggers the terminal to resend is indicated by k1 (that is, a HARQ-ACK feedback timing indication) in the DCI, that is, the terminal may be triggered to re-feed back a HARQ-ACK in slot n+k1 (n is a time for receiving the DCI).

If DCI 1 is uplink allocation DCI, such as DCI format 0_0, DCI format 0_1, or DCI format 0_2, a time unit that may trigger the terminal to resend is indicated by k2 (that is, a DCI to PUSCH transmission timing indication during PUSCH scheduling) in the DCI, that is, the terminal is triggered to re-feed back a HARQ-ACK in slot n+k2 (n is a time for receiving the DCI).

A resource for resending the HARQ-ACK may be a PUCCH or a PUSCH. The PUCCH or PUSCH may be the same as or different from the previous PUCCH or PUSCH. In this embodiment of this application, a resource determining manner is not limited.

Optionally, when the DCI triggers the terminal to resend the HARQ-ACK, the base station may further configure several codebook indexes or states by using higher layer signaling. Each codebook index or state corresponds to a HARQ process and/or serving cell. During triggering, the base station indicates which codebook index or state is triggered. In this case, the terminal may feed back corresponding HARQ-ACK information based on a corresponding HARQ process (in this case, the HARQ-ACK retransmission may be all HARQ-ACK information that has not been transmitted, that is, newly transmitted HARQ-ACKs, which may be collectively referred to as HARQ-ACK retransmission).

In this embodiment of this application, if the terminal determines, based on the scheduling information, that retransmission of the historical HARQ-ACK is triggered, and determines that the scheduled second HARQ-ACK of the one or more PDSCHs and/or PDCCHs and the scheduled first HARQ-ACK are fed back within the same time unit, the terminal feeds back the first HARQ-ACK and/or the second HARQ-ACK to the network-side device. Therefore, HARQ-ACK retransmission on a PUCCH resource can be triggered and implemented, it can be ensured that HARQ-ACK retransmission can be effectively implemented, and effectiveness of a communications system can be improved.

Optionally, in a case that a first target PUCCH includes a first PUCCH, the first PUCCH is used to feed back the first HARQ-ACK and the second HARQ-ACK; and the receiving the first HARQ-ACK and/or a second HARQ-ACK includes at least one of the following:

receiving the first PUCCH, where the first PUCCH includes the concatenated first HARQ-ACK and second HARQ-ACK; or in a case that a first HARQ process includes a second HARQ process, receiving the first PUCCH, where the first PUCCH includes only the first HARQ-ACK, the first HARQ process is a HARQ process corresponding to the first HARQ-ACK, and the second HARQ process is a HARQ process corresponding to the second HARQ-ACK.

Optionally, the first target PUCCH may include only one PUCCH, that is, the first PUCCH.

Optionally, the first PUCCH may be used to feed back at least one of the first HARQ-ACK or the second HARQ-ACK.

Optionally, the first PUCCH may be used to feed back the first HARQ-ACK and the second HARQ-ACK.

Optionally, when the network-side device receives the first HARQ-ACK and/or the second HARQ-ACK, the receiving may be implemented by at least one of the following (i) to (ii:

(i) Receive the first PUCCH, where the first PUCCH includes the concatenated first HARQ-ACK and second HARQ-ACK.

Optionally, the terminal may first concatenate the first HARQ-ACK for retransmitting the historical HARQ-ACK and the second HARQ-ACK transmitted for the first time, and then send the first PUCCH to the network-side device. In this case, the network-side device may receive the concatenated first HARQ-ACK and second HARQ-ACK.

For example, the second HARQ-ACK of a PDSCH scheduled or activated by a piece of DCI is placed after or before the first HARQ-ACK.

For example, the second HARQ-ACK corresponding to a piece of DCI is placed after or before the first HARQ-ACK.

(ii) In a case that the first HARQ process includes the second HARQ process, receive the first PUCCH.

Optionally, the terminal may send the first PUCCH to the network-side device in a case that the first HARQ process corresponding to the first HARQ-ACK includes the second HARQ process corresponding to the second HARQ-ACK, where the first PUCCH includes only the first HARQ-ACK, that is, the terminal may feed back only the first HARQ-ACK, and the network-side device may receive the first PUCCH including only the first HARQ-ACK.

For example, the first HARQ-ACK is HARQ-ACK information corresponding to a specific HARQ process, that is, the enhanced type 3 codebook.

Optionally, the terminal may refer to (i) for execution in a case that the first HARQ process corresponding to the first HARQ-ACK does not include the second HARQ process corresponding to the second HARQ-ACK.

Optionally, a corresponding HARQ process when DCI deactivates SPS may be determined or predefined in a predefined manner. For example, the HARQ process may be a HARQ process corresponding to an SPS PDSCH that the HARQ process releases in a next cycle.

Optionally, the scheduling information is further used to indicate that a first HARQ process includes a second HARQ process; and the receiving the first HARQ-ACK and/or a second HARQ-ACK includes:

in a case that a first target PUCCH includes a first PUCCH and that the first PUCCH is used to feed back the first HARQ-ACK and the second HARQ-ACK, receiving the first PUCCH, where the first PUCCH is sent by the terminal only in a case that the first HARQ process includes the second HARQ process.

Optionally, the network-side device may indicate, by using scheduling information, that the first HARQ process includes the second HARQ process; and the terminal may send the first PUCCH to the network-side device only in a case that the indication is received.

For example, the terminal may expect that the first HARQ process corresponding to the first HARQ-ACK includes the second HARQ process corresponding to the second HARQ-ACK. Otherwise, it is an error scenario. For example, the terminal may expect that the first HARQ-ACK is HARQ-ACK information corresponding to a specific HARQ process, that is, a scenario of the enhanced type 3 codebook. In other scenarios, the first HARQ-ACK does not need to be transmitted.

Optionally, the first target PUCCH includes a second PUCCH and a third PUCCH, where the second PUCCH is used to feed back the first HARQ-ACK, and the third PUCCH is used to feed back the second HARQ-ACK.

Optionally, the first target PUCCH may include two PUCCHs, that is the second PUCCH and the third PUCCH.

Optionally, the second PUCCH may be used to feed back the first HARQ-ACK.

Optionally, the third PUCCH may be used to feed back the second HARQ-ACK.

Assuming that the scheduling information is DCI, the third PUCCH may be a PUCCH corresponding to a HARQ-ACK corresponding to a PDSCH scheduled by the DCI, or an SPS PDSCH activated by the DCI, or an SPS PDSCH released by the DCI.

Optionally, the first HARQ-ACK is retransmission of the historical HARQ-ACK before the network-side device receives the first HARQ-ACK and/or the second HARQ-ACK.

Optionally, the historical HARQ-ACK may be a HARQ-ACK transmitted or discarded before the network-side device receives the first HARQ-ACK and/or the second HARQ-ACK.

Optionally, the first HARQ-ACK may be retransmission of a historical HARQ-ACK transmitted or discarded within a time unit or some time units.

Optionally, the scheduling information includes a first information field, and the first information field is used to instruct to trigger retransmission of the historical HARQ-ACK corresponding to a target priority.

Optionally, the network-side device may send the scheduling information to the terminal, and schedule retransmission of a historical HARQ-ACK corresponding to a priority (that is, the target priority) by using the first information field in the scheduling information.

For example, the first information field may instruct to trigger retransmission of a historical HARQ-ACK with a low priority among historical HARQ-ACKs. In this case, the terminal may use the historical HARQ-ACK with the low priority among the historical HARQ-ACKs as the first HARQ-ACK.

Optionally, a priority of the first HARQ-ACK is determined according to a predefined rule.

Specifically, when the DCI triggers retransmission of the historical HARQ-ACK on a PUCCH resource, a problem of determining a priority for retransmission is also unclear.

Optionally, the network-side device may determine the priority of the first HARQ-ACK according to the predefined rule. For example, the network-side device determines, according to the predefined rule, that the priority of the first HARQ-ACK is the same as that of the historical HARQ-ACK. For example, the predefined rule may directly specify that the priority of the first HARQ-ACK is a high priority or low priority.

Optionally, the scheduling information includes a second information field, and the second information field is used to indicate a priority of the first HARQ-ACK.

Optionally, the priority of the first HARQ-ACK may also be determined based on the scheduling information.

Optionally, the scheduling information may include the second information field, and the second information field is used to indicate the priority of the first HARQ-ACK.

Optionally, the network-side device may send the scheduling information to the terminal, and indicate the priority of the first HARQ-ACK by using the second information field in the scheduling information.

Optionally, in a case that the scheduling information includes the second information field and does not include the first information field, the target priority is determined according to a predefined rule.

Optionally, the scheduling information may include only the second information field, and the second information field is used to indicate the priority of the first HARQ-ACK. In this case, the network-side device may determine, according to the predefined rule, that a historical HARQ-ACK corresponding to a target priority among the historical HARQ-ACKs needs to be retransmitted.

For example, the network-side device may determine, according to the predefined rule, that a historical HARQ-ACK corresponding to a high priority among the historical HARQ-ACKs needs to be retransmitted, and determine, based on a second indication field, that the priority of the first HARQ-ACK is a high priority.

For example, the network-side device may determine, according to the predefined rule, that a historical HARQ-ACK corresponding to a low priority among the historical HARQ-ACKs needs to be retransmitted, and determine, based on a second indication field, that the priority of the first HARQ-ACK is a high priority.

For example, the network-side device may determine, according to the predefined rule, that a historical HARQ-ACK corresponding to a low priority among the historical HARQ-ACKs needs to be retransmitted, and determine, based on a second indication field, that the priority of the first HARQ-ACK is a low priority.

For example, the network-side device may determine, according to the predefined rule, that a historical HARQ-ACK corresponding to a high priority among the historical HARQ-ACKs needs to be retransmitted, and determine, based on a second indication field, that the priority of the first HARQ-ACK is a low priority.

Optionally, the scheduling information may further include both a first information field and a second information field. For example, the first information field instructs to trigger retransmission of a historical HARQ-ACK corresponding to a high priority, and the second information field indicates that the priority of the first HARQ-ACK is a high priority.

Optionally, the scheduling information may further include both a first information field and a second information field. For example, the first information field instructs to trigger retransmission of a historical HARQ-ACK corresponding to a low priority, and the second information field indicates that the priority of the first HARQ-ACK is a high priority.

Optionally, the scheduling information may further include both a first information field and a second information field. For example, the first information field instructs to trigger retransmission of a historical HARQ-ACK corresponding to a high priority, and the second information field indicates that the priority of the first HARQ-ACK is a low priority.

Optionally, the scheduling information may further include both a first information field and a second information field. For example, the first information field instructs to trigger retransmission of a historical HARQ-ACK corresponding to a low priority, and the second information field indicates that the priority of the first HARQ-ACK is a low priority.

Optionally, in a case that the first information field and the second information field are the same, the priority of the first HARQ-ACK and the target priority are the same.

Optionally, in a case that the first information field and the second information field are the same, when the priority of the first HARQ-ACK is determined, the priority of the first HARQ-ACK may be the target priority.

Optionally, in a case that the first information field and the second information field are the same, the priority of the first HARQ-ACK and the target priority are different.

Optionally, in a case that the first information field and the second information field are the same, when determining the priority of the first HARQ-ACK, the network-side device may determine that the priority of the first HARQ-ACK is a priority different from the target priority.

Optionally, the scheduling information includes a third information field, and the third information field is used to instruct to trigger retransmission of a historical HARQ-ACK corresponding to a second target PUCCH.

Optionally, the scheduling information may include the third information field, and the third information field is used to instruct to trigger retransmission of the historical HARQ-ACK corresponding to the second target PUCCH.

Optionally, the network-side device may send the scheduling information to the terminal, where the third information field in the scheduling information is used to instruct to retransmit a historical HARQ-ACK corresponding to a PUCCH or some PUCCHs (second target PUCCHs).

Optionally, if the terminal determines, based on the scheduling information, that the historical HARQ-ACK corresponding to the second target PUCCH needs to be retransmitted, the terminal may determine to use the historical HARQ-ACK corresponding to the second target PUCCH as the first HARQ-ACK.

Optionally, the scheduling information includes a fourth information field, and the fourth information field is used to indicate a priority of the first HARQ-ACK.

Optionally, the scheduling information may include the fourth information field, and the fourth information field is used to indicate the priority of the first HARQ-ACK.

Optionally, the network-side device may send the scheduling information to the terminal, and indicate the priority of the first HARQ-ACK by using the fourth information field in the scheduling information.

Optionally, the scheduling information may include the third information field and the fourth information field, and the terminal may determine, based on the third information field, to retransmit the historical HARQ-ACK corresponding to the second target PUCCH, that is, the first HARQ-ACK is determined, and the terminal may further determine the priority of the first HARQ-ACK based on the fourth information field.

Optionally, in a case that the second target PUCCH corresponds to only one priority, a priority of a first target PUCCH and a priority of the second target PUCCH are the same.

Optionally, in a case that the second target PUCCH corresponds to only one priority, the priority of the first target PUCCH and the priority of the second target PUCCH may be the same.

Optionally, the priority of the first target PUCCH may be considered as a priority of a PUCCH for transmitting the first HARQ-ACK and/or the second HARQ-ACK.

Optionally, a priority of each PUCCH may be determined based on the priority of the HARQ-ACK carried by the PUCCH.

Optionally, in a case that the second target PUCCH corresponds to only one priority, the scheduling information includes a fifth information field, and the fifth information field is used to indicate at least one of the following:

a priority of a first target PUCCH;

a priority of the first HARQ-ACK, where the priority of the first HARQ-ACK is used to determine the priority of the first target PUCCH; or a priority of the second target PUCCH.

Optionally, in a case that the second target PUCCH corresponds to only one priority, the scheduling information may include the fifth information field, and the network-side device may indicate both the priority of the first target PUCCH and the priority of the second target PUCCH by using the fifth information field. In other words, the terminal may determine the first HARQ-ACK based on the priority of the second target PUCCH. For example, if the priority of the second target PUCCH is a high priority, the terminal may determine that the first HARQ-ACK is retransmission of a historical HARQ-ACK with a high priority.

Optionally, in a case that the second target PUCCH corresponds to at least two priorities, a priority of a first target PUCCH is determined according to a predefined rule.

For example, the scheduling information may indicate that the second target PUCCH corresponds to a high priority and a low priority. In this case, it may be determined, according to the predefined rule, that the priority of the first target PUCCH is a higher priority among the priorities corresponding to the second target PUCCH.

For example, the scheduling information may indicate that the second target PUCCH corresponds to a high priority and a low priority. In this case, it may be determined, according to the predefined rule, that the priority of the first target PUCCH is a high priority.

Figure 5:
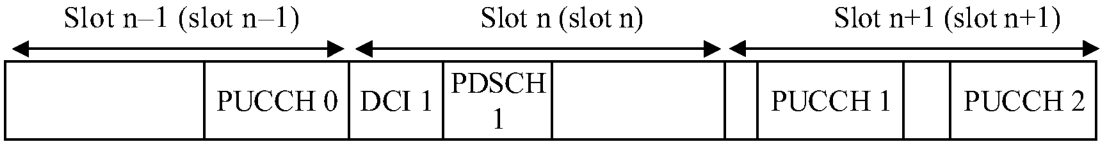
FIG. 5 is a second schematic diagram of a method in which DCI triggers a terminal to resend a HARQ-ACK according to an embodiment of this application.

FIG. 5 is a second schematic diagram of a method in which DCI triggers the terminal to resend a HARQ-ACK according to an embodiment of this application. As shown in FIG. 5, in slot n−1, PUCCH 0 carrying a HARQ-ACK is discarded due to some reasons, for example, because no PDCCH corresponds to PUCCH 0, that is, all HARQ-ACKs carried by PUCCH 0 are HARQ-ACKs of an SPS PDSCH. Some or all symbols of PUCCH 0 are configured as DL symbols. Alternatively, PUCCH 0 has a low priority and is discarded because its time domain resource overlaps that of a high-priority PUCCH and/or PUSCH.

In slot n, the terminal may receive DCI 1, where DCI 1 schedules PDSCH 1 and indicates that a timing from a PDSCH to a HARQ-ACK is 1, that is, a HARQ-ACK of PDSCH 1 is fed back in slot n+1. In addition, DCI 1 triggers the terminal to re-feed back the HARQ-ACK PUCCH discarded in slot n−1.

A priority of the HARQ-ACK PUCCH triggered by the DCI and a priority during retransmission may be determined by using the following (a1) to (a3):

(a1) DCI 1 may include information 1 for indicating a target priority of the triggered discarded historical PUCCH, for example, one bit, where 0 indicates a low priority, and 1 indicates a high priority, or two bits, where 00 means not triggering the discarded HARQ-ACK PUCCH, 01 means triggering a low-priority HARQ-ACK, 10 means triggering a high-priority HARQ-ACK, and 11 means triggering both low-priority and high-priority HARQ-ACKs.

DCI 1 may include information 2 for indicating a priority of the triggered discarded PUCCH during retransmission, that is, a priority of a PUCCH for a first HARQ-ACK. For example, one bit is used to indicate a low priority or a high priority. Information 1 and information 2 may be one information field, that is, the priority of the triggered discarded PUCCH is the same as the priority of the PUCCH during retransmission.

(a2) DCI 1 may include information 1 for indicating the target priority of the triggered discarded historical PUCCH, for example, one bit, where 0 indicates a low priority, and 1 indicates a high priority, or two bits, where 00 means not triggering the discarded HARQ-ACK PUCCH, 01 means triggering a low-priority HARQ-ACK, 10 means triggering a high-priority HARQ-ACK, and 11 means triggering both low-priority and high-priority HARQ-ACKs. The priority of the triggered discarded PUCCH during retransmission (the priority of the PUCCH for the first HARQ-ACK) remains unchanged and is the same as before.

(a3) DCI 1 may include information 1 for indicating the triggered discarded PUCCH (without prioritization).

DCI 1 may include information 2 for indicating the priority of the triggered discarded PUCCH during retransmission. For example, one bit is used to indicate a low priority or a high priority.

Optionally, a HARQ-ACK codebook for transmitting the triggered first HARQ-ACK (for example, the HARQ-ACK carried by PUCCH 0 or a HARQ-ACK corresponding to a specific HARQ process) and a second HARQ-ACK of a PDSCH scheduled by the DCI may be constructed by using the following (b1) to (b3):

(b1) In slot n+1, the terminal feeds back the triggered first HARQ-ACK and the second HARQ-ACK corresponding to the PDSCH scheduled or activated by the DCI or the second HARQ-ACK corresponding to the DCI. The terminal may concatenate the triggered first HARQ-ACK and the second HARQ-ACK corresponding to the PDSCH scheduled or activated by the DCI or the second HARQ-ACK corresponding to the DCI, for example, place the second HARQ-ACK corresponding to the PDSCH scheduled or activated by the DCI or the second HARQ-ACK corresponding to the DCI after or before the triggered first HARQ-ACK.

(b2) If a first HARQ process corresponding to the triggered first HARQ-ACK (for example, DCI 1 triggers the terminal to send HARQ-ACK information corresponding to a specific HARQ process) includes a second HARQ process corresponding to the PDSCH scheduled or activated by the DCI, the terminal feeds back only the triggered first HARQ-ACK; otherwise the terminal refers to (b1) for execution.

(b3) The first HARQ process included in the first HARQ-ACK that the terminal expects to trigger includes the second HARQ process corresponding to the PDSCH scheduled or activated by the DCI; otherwise, it is an error scenario.

Optionally, a corresponding HARQ process when the DCI is used to deactivate SPS may be determined or predefined in a predefined manner. For example, the HARQ process may be a HARQ process corresponding to an SPS PDSCH that the HARQ process releases in a next cycle.

Optionally, a resource of a first target PUCCH for transmitting the first HARQ-ACK corresponding to the historical HARQ-ACK triggered for retransmission and the second HARQ-ACK of the PDSCH scheduled by the DCI may be determined by using the following (c1) to (c3):

(c1) The first HARQ-ACK and the second HARQ-ACK may be transmitted on a same PUCCH resource (first PUCCH), where the second HARQ-ACK of the PDSCH scheduled by the DCI may be added before or after the first HARQ-ACK, and the resource of the first PUCCH is determined based on the total number of bits of the first HARQ-ACK and the second HARQ-ACK.

(c2) On different PUCCH resources (such as a second PUCCH and a third PUCCH), for example, the first HARQ-ACK is transmitted on a PUCCH resource corresponding to the historical HARQ-ACK, and the second HARQ-ACK of the PDSCH scheduled by the DCI may be determined based on the number of bits of the second HARQ-ACK and an indication of a PRI. Alternatively, the first HARQ-ACK and the second HARQ-ACK of the PDSCH scheduled by the DCI may be determined based on an indication of the number of HARQ-ACK bits and a PRI of the first HARQ-ACK and an indication of the number of HARQ-ACK bits and a PRI of the second HARQ-ACK respectively.

(c3) When a priority of the historical HARQ-ACK or a priority of the corresponding first HARQ-ACK during retransmission is the same as that of the second HARQ-ACK of the PDSCH scheduled by the DCI, refer to (c1) for execution, or when the priorities are different, refer to (c2) for execution.

Figure 6:
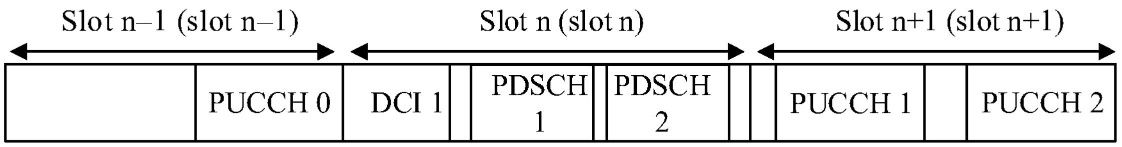
FIG. 6 is a third schematic diagram of a method in which DCI triggers a terminal to resend a HARQ-ACK according to an embodiment of this application.

FIG. 6 is a third schematic diagram of a method in which DCI triggers the terminal to resend a HARQ-ACK according to an embodiment of this application. As shown in FIG. 6, a base station may send DCI 1 to trigger the terminal to retransmit a historical HARQ-ACK on PUCCH 0 in slot n+1. In addition, the base station may schedule or configure a second HARQ-ACK of PDSCH 1 and PDSCH 2 for feedback in slot n+1. Then in slot n+1, the terminal may transmit a first HARQ-ACK and/or the second HARQ-ACK according to the following (d1) to (d3).

(d1) The first HARQ-ACK and the second HARQ-ACK may be transmitted on a same PUCCH resource (first PUCCH), where the second HARQ-ACK of PDSCH 1 and PDSCH 2 may be added before or after the first HARQ-ACK, and a resource of a first target PUCCH is determined based on the total number of bits of the first HARQ-ACK and the second HARQ-ACK, that is, a codebook includes sub-codebook 1 (retransmission) and sub-codebook 2 (new retransmission), where a sub-codebook of the second HARQ-ACK of PDSCH 1 and PDSCH 2 may be transmitted in a conventional manner.

(d2) The first HARQ-ACK and the second HARQ-ACK may be transmitted on different PUCCH resources (a second PUCCH and a third PUCCH). For example, the first HARQ-ACK is transmitted on a PUCCH resource corresponding to the historical HARQ-ACK, and the second HARQ-ACK of PDSCH 1 and PDSCH 2 may be transmitted in a conventional manner. For example, for the PDSCH scheduled by the DCI, a transmission resource is determined based on the number of bits of the second HARQ-ACK and an indication of a PRI. Alternatively, for the first HARQ-ACK and the second HARQ-ACK of the PDSCH scheduled by the DCI, a transmission resource may be determined based on an indication of the number of HARQ-ACK bits and a PRI of the first HARQ-ACK and an indication of the number of HARQ-ACK bits and a PRI of the second HARQ-ACK respectively.

(d3) When a priority of the historical HARQ-ACK or a priority of the corresponding first HARQ-ACK during retransmission is the same as that of the second HARQ-ACK of the PDSCH scheduled by the DCI, refer to (d1) for execution, or when the priorities are different, refer to (d2) for execution.

Figure 7:
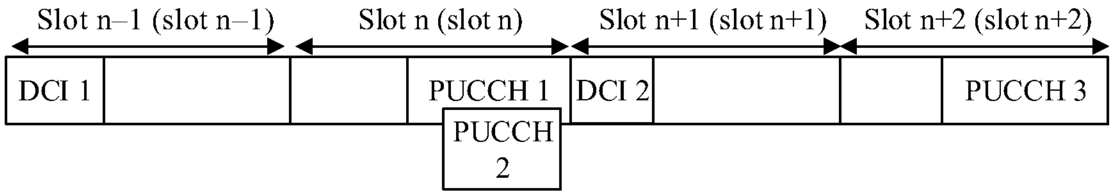
FIG. 7 is a fourth schematic diagram of a method in which DCI triggers a terminal to resend a HARQ-ACK according to an embodiment of this application.

FIG. 7 is a fourth schematic diagram of a method in which DCI triggers the terminal to resend a HARQ-ACK according to an embodiment of this application. As shown in FIG. 7, in slot n−1, a base station may send DCI 1 to schedule a PDSCH, and a second HARQ-ACK corresponding to the PDSCH is fed back on PUCCH 1, where PUCCH 1 has a low priority (LP). In addition, in slot n, time domain resources overlap between high-priority PUCCH 2 and LP PUCCH 1. Therefore, LP PUCCH 1 is discarded.

In slot n+1, the base station may send DCI 2 to trigger the terminal to resend HARQ-ACK information (historical HARQ-ACK) carried on PUCCH 1 in slot n+2. For example, DCI 2 instructs the terminal to resend the HARQ-ACK (historical HARQ-ACK) discarded in slot n or an LP HARQ-ACK (historical HARQ-ACK) to be transmitted in slot n.

However, on the terminal side, the terminal does not detect DCI 1 in slot n−1. Therefore, the terminal does not know that PUCCH 1 is scheduled and discarded. In slot n+1, the terminal receives DCI 2. According to the instruction of DCI 2, the terminal needs to re-feed back the historical HARQ-ACK discarded in slot n, but from a perspective of the UE, the terminal has no historical HARQ-ACK discarded in slot n. Therefore, the terminal does not know how to feed back HARQ-ACK information in slot n+2.

In this case, it may be specified that the terminal feeds back specific HARQ-ACK information in slot n+2, such as a predefined HARQ-ACK codebook, for example, a type 3 codebook, or a HARQ-ACK codebook corresponding to a codebook/state index is predefined, or a codebook corresponding to a HARQ process is predefined.

A PUCCH resource for transmitting a HARQ-ACK in slot n+2 may be a predefined PUCCH resource, or a PUCCH resource determined based on the number of HARQ-ACK bits determined by using the foregoing method.

On the base station side, in slot n+2, the base station may blindly receive the PUCCH according to the following two different assumptions (e1) and (e2).

(e1) The terminal receives DCI 1 in slot n−1. The terminal can correctly understand HARQ-ACK information triggered by DCI 2 and transmit the HARQ-ACK information on a corresponding PUCCH resource.

(e2) The terminal does not detect DCI 1 in slot n−1. The terminal does not know the discarded PUCCH 1 and the HARQ-ACK information carried by PUCCH 1, and will transmit a predefined codebook, and the base station will perform detection on a PUCCH resource corresponding to the UE.

In this embodiment of this application, if the terminal determines, based on the scheduling information, that retransmission of the historical HARQ-ACK is triggered, and determines that the scheduled second HARQ-ACK of the one or more PDSCHs and/or PDCCHs and the scheduled first HARQ-ACK are fed back within the same time unit, the terminal feeds back the first HARQ-ACK and/or the second HARQ-ACK to the network-side device. Therefore, HARQ-ACK retransmission on a PUCCH resource can be triggered and implemented, it can be ensured that HARQ-ACK retransmission can be effectively implemented, and effectiveness of a communications system can be improved.

It should be noted that the HARQ-ACK transmission method provided in this embodiment of this application may be performed by a HARQ-ACK transmission apparatus or a control module for performing the HARQ-ACK transmission method in the HARQ-ACK transmission apparatus. A HARQ-ACK transmission apparatus provided in an embodiment of this application is described by assuming that the HARQ-ACK transmission method in this embodiment of this application is performed by the HARQ-ACK transmission apparatus.

Figure 8:
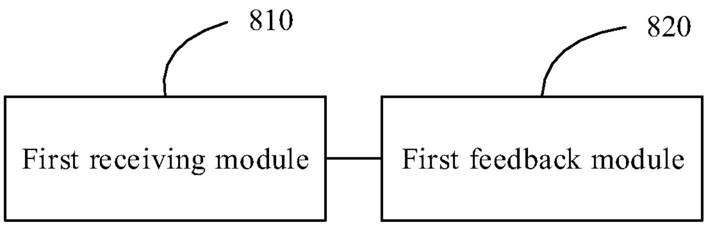
FIG. 8 is a first schematic diagram of a structure of a HARQ-ACK transmission apparatus according to an embodiment of this application.

FIG. 8 is a first schematic diagram of a structure of a HARQ-ACK transmission apparatus according to an embodiment of this application. As shown in FIG. 8, the apparatus includes a first receiving module 810 and a first feedback module 820.

The first receiving module 810 is configured to receive scheduling information sent by a network-side device.

The first feedback module 820 is configured to: in a case that a terminal determines, based on the scheduling information, that a first HARQ-ACK is triggered and that a second HARQ-ACK and the first HARQ-ACK are fed back within a same time unit, feed back, by the terminal, the first HARQ-ACK and/or the second HARQ-ACK to the network-side device, where the second HARQ-ACK is a first feedback of a HARQ-ACK of one or more PDSCHs and/or PDCCHs, and the first HARQ-ACK includes retransmission of a historical HARQ-ACK.

Optionally, the HARQ-ACK transmission apparatus may use the first receiving module 810 to receive the scheduling information sent by the network-side device, and then in the case that the terminal determines, based on the scheduling information, that the first HARQ-ACK is triggered and that the second HARQ-ACK and the first HARQ-ACK are fed back within the same time unit, provide the first feedback module 820 to feed back the first HARQ-ACK and/or the second HARQ-ACK to the network-side device, where the second HARQ-ACK is the first feedback of the HARQ-ACK of the one or more PDSCHs and/or PDCCHs, and the first HARQ-ACK includes retransmission of the historical HARQ-ACK.

In this embodiment of this application, if the terminal determines, based on the scheduling information, that retransmission of the historical HARQ-ACK is triggered, and determines that the scheduled second HARQ-ACK of the one or more PDSCHs and/or PDCCHs and the scheduled first HARQ-ACK are fed back within the same time unit, the terminal feeds back the first HARQ-ACK and/or the second HARQ-ACK to the network-side device. Therefore, HARQ-ACK retransmission on a PUCCH resource can be triggered and implemented, it can be ensured that HARQ-ACK retransmission can be effectively implemented, and effectiveness of a communications system can be improved.

Optionally, the first feedback module is further configured to:

determine a first target PUCCH for transmitting the first HARQ-ACK and/or the second HARQ-ACK.

Optionally, in a case that the first target PUCCH includes a first PUCCH, the first PUCCH is used to feed back at least one of the first HARQ-ACK or the second HARQ-ACK; and the first feedback module is further configured to:

concatenate, by the terminal, the first HARQ-ACK and the second HARQ-ACK, and send, by the terminal, the first PUCCH to the network-side device, where the first PUCCH includes the concatenated first HARQ-ACK and second HARQ-ACK;

in a case that a first HARQ process includes a second HARQ process, send, by the terminal, the first PUCCH to the network-side device, where the first PUCCH includes only the first HARQ-ACK, the first HARQ process is a HARQ process corresponding to the first HARQ-ACK, and the second HARQ process is a HARQ process corresponding to the second HARQ-ACK; and send, by the terminal, the first PUCCH to the network-side device only in a case that the first HARQ process includes the second HARQ process.

Optionally, the first target PUCCH includes a second PUCCH and a third PUCCH, where the second PUCCH is used to feed back the first HARQ-ACK, and the third PUCCH is used to feed back the second HARQ-ACK.

Optionally, in a case that the second PUCCH and the third PUCCH have at least one of the following: a same priority, same transmission parameter information, or overlapping transmission resources, the first feedback module is further configured to:

multiplex, by the terminal, the first HARQ-ACK and the second HARQ-ACK on one PUCCH.

Optionally, the first HARQ-ACK is retransmission of the historical HARQ-ACK before the terminal feeds back the first HARQ-ACK and/or the second HARQ-ACK to the network-side device.

Optionally, the scheduling information includes a first information field, and the first information field is used to instruct to trigger retransmission of the historical HARQ-ACK corresponding to a target priority.

Optionally, a priority of the first HARQ-ACK is determined according to a predefined rule.

Optionally, the scheduling information includes a second information field, and the second information field is used to indicate a priority of the first HARQ-ACK.

Optionally, in a case that the scheduling information includes the second information field and does not include the first information field, the target priority is determined according to a predefined rule.

Optionally, in a case that the first information field and the second information field are the same, the priority of the first HARQ-ACK and the target priority are the same.

Optionally, in a case that the first information field and the second information field are the same, the priority of the first HARQ-ACK and the target priority are different.

Optionally, the scheduling information includes a third information field, and the third information field is used to instruct to trigger retransmission of a historical HARQ-ACK corresponding to a second target PUCCH.

Optionally, the scheduling information includes a fourth information field, and the fourth information field is used to indicate a priority of the first HARQ-ACK.

Optionally, in a case that the second target PUCCH corresponds to only one priority, a priority of a first target PUCCH and a priority of the second target PUCCH are the same.

Optionally, in a case that the second target PUCCH corresponds to only one priority, the scheduling information includes a fifth information field, and the fifth information field is used to indicate at least one of the following:

a priority of a first target PUCCH;

a priority of the first HARQ-ACK, where the priority of the first HARQ-ACK is used to determine the priority of the first target PUCCH; or a priority of the second target PUCCH.

Optionally, in a case that the second target PUCCH corresponds to at least two priorities, a priority of a first target PUCCH is determined according to a predefined rule.

Optionally, a priority of a first target PUCCH is determined based on an indication from the network-side device, determined according to a predefined rule, or determined based on a higher layer configuration.

Optionally, transmission parameter information of a first target PUCCH and transmission parameter information of a fourth PUCCH are the same; and the transmission parameter information includes at least one of the following:

a PUCCH resource index;

start and end positions of transmission;

a symbol length; or transmit power.

Optionally, the apparatus further includes:

a first execution module, configured to perform any one of the following in a case that the first HARQ-ACK is scheduled for the terminal but the second HARQ-ACK that needs to be fed back does not exist or the historical HARQ-ACK does not exist;

not feeding back the first HARQ-ACK to the network-side device; and transmitting a default codebook to the network-side device.

In this embodiment of this application, if the terminal determines, based on the scheduling information, that retransmission of the historical HARQ-ACK is triggered, and determines that the scheduled second HARQ-ACK of the one or more PDSCHs and/or PDCCHs and the scheduled first HARQ-ACK are fed back within the same time unit, the terminal feeds back the first HARQ-ACK and/or the second HARQ-ACK to the network-side device. Therefore, HARQ-ACK retransmission on a PUCCH resource can be triggered and implemented, it can be ensured that HARQ-ACK retransmission can be effectively implemented, and effectiveness of a communications system can be improved.

The HARQ-ACK transmission apparatus in this embodiment of this application may be an apparatus, or an apparatus or an electronic device with an operating system, or may be a component, an integrated circuit, or a chip in the terminal. The apparatus or the electronic device may be a mobile terminal, or may be a nonmobile terminal. For example, the mobile terminal may include but is not limited to the foregoing illustrated type of the terminal 11. The nonmobile terminal may be a server, a network attached storage (NAS), a personal computer (PC), a television (TV), a teller machine, a self-service machine, or the like. This is not specifically limited in this embodiment of this application.

The HARQ-ACK transmission apparatus provided in this embodiment of this application can implement each process implemented by the method embodiments in FIG. 2 to FIG. 7, with the same technical effect achieved. To avoid repetition, details are not described herein again.

Figure 9:
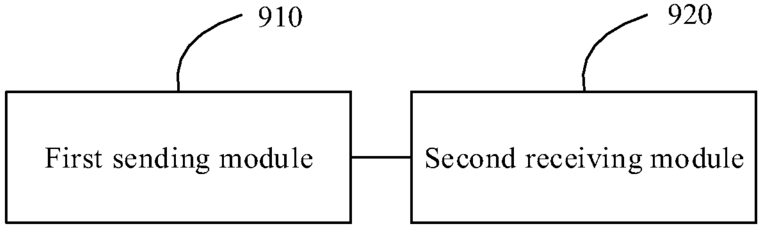
FIG. 9 is a second schematic diagram of a structure of a HARQ-ACK transmission apparatus according to an embodiment of this application.

FIG. 9 is a second schematic diagram of a structure of a HARQ-ACK transmission apparatus according to an embodiment of this application. As shown in FIG. 9, the apparatus includes a first sending module 910 and a second receiving module 920.

The first sending module 910 is configured to send scheduling information to a terminal, where the scheduling information is used to trigger a first HARQ-ACK, and the first HARQ-ACK includes retransmission of a historical HARQ-ACK.

The second receiving module 920 is configured to receive the first HARQ-ACK and/or a second HARQ-ACK, where the first HARQ-ACK and/or the second HARQ-ACK are/is fed back in a case that the terminal determines that the first HARQ-ACK is triggered for retransmission and determines that the second HARQ-ACK and the first HARQ-ACK are fed back within a same time unit, and the second HARQ-ACK is a first feedback of a HARQ-ACK of one or more PDSCHs and/or PDCCHs.

Optionally, the HARQ-ACK transmission apparatus may send the scheduling information to the terminal by using the first sending module 910, where the scheduling information is used to trigger the first HARQ-ACK, and the first HARQ-ACK includes retransmission of the historical HARQ-ACK; and then may provide the second receiving module 920 to receive the first HARQ-ACK and/or the second HARQ-ACK, where the first HARQ-ACK and/or the second HARQ-ACK are/is fed back in the case that the terminal determines that the first HARQ-ACK is triggered for retransmission and determines that the second HARQ-ACK and the first HARQ-ACK are fed back within the same time unit, and the second HARQ-ACK is the first feedback of the HARQ-ACK of the one or more PDSCHs and/or PDCCHs.

In this embodiment of this application, if the terminal determines, based on the scheduling information, that retransmission of the historical HARQ-ACK is triggered, and determines that the scheduled second HARQ-ACK of the one or more PDSCHs and/or PDCCHs and the scheduled first HARQ-ACK are fed back within the same time unit, the terminal feeds back the first HARQ-ACK and/or the second HARQ-ACK to the network-side device. Therefore, HARQ-ACK retransmission on a PUCCH resource can be triggered and implemented, it can be ensured that HARQ-ACK retransmission can be effectively implemented, and effectiveness of a communications system can be improved.

Optionally, in a case that a first target PUCCH includes a first PUCCH, the first PUCCH is used to feed back the first HARQ-ACK and the second HARQ-ACK; and the second receiving module is further configured to perform at least one of the following:

receiving the first PUCCH, where the first PUCCH includes the concatenated first HARQ-ACK and second HARQ-ACK; or in a case that a first HARQ process includes a second HARQ process, receiving the first PUCCH, where the first PUCCH includes only the first HARQ-ACK, the first HARQ process is a HARQ process corresponding to the first HARQ-ACK, and the second HARQ process is a HARQ process corresponding to the second HARQ-ACK.

Optionally, the scheduling information is further used to indicate that a first HARQ process includes a second HARQ process; and the second receiving module is further configured to perform:

in a case that a first target PUCCH includes a first PUCCH and that the first PUCCH is used to feed back the first HARQ-ACK and the second HARQ-ACK, receiving the first PUCCH, where the first PUCCH is sent by the terminal only in a case that the first HARQ process includes the second HARQ process.

Optionally, the first target PUCCH includes a second PUCCH and a third PUCCH, where the second PUCCH is used to feed back the first HARQ-ACK, and the third PUCCH is used to feed back the second HARQ-ACK.

Optionally, the first HARQ-ACK is retransmission of the historical HARQ-ACK before the network-side device receives the first HARQ-ACK and/or the second HARQ-ACK.

Optionally, the scheduling information includes a first information field, and the first information field is used to instruct to trigger retransmission of the historical HARQ-ACK corresponding to a target priority.

Optionally, a priority of the first HARQ-ACK is determined according to a predefined rule.

Optionally, the scheduling information includes a second information field, and the second information field is used to indicate a priority of the first HARQ-ACK.

Optionally, in a case that the scheduling information includes the second information field and does not include the first information field, the target priority is determined according to a predefined rule.

Optionally, in a case that the first information field and the second information field are the same, the priority of the first HARQ-ACK and the target priority are the same.

Optionally, in a case that the first information field and the second information field are the same, the priority of the first HARQ-ACK and the target priority are different.

Optionally, the scheduling information includes a third information field, and the third information field is used to instruct to trigger retransmission of a historical HARQ-ACK corresponding to a second target PUCCH.

Optionally, the scheduling information includes a fourth information field, and the fourth information field is used to indicate a priority of the first HARQ-ACK.

Optionally, in a case that the second target PUCCH corresponds to only one priority, a priority of a first target PUCCH and a priority of the second target PUCCH are the same.

Optionally, in a case that the second target PUCCH corresponds to only one priority, the scheduling information includes a fifth information field, and the fifth information field is used to indicate at least one of the following:

a priority of a first target PUCCH;

a priority of the first HARQ-ACK, where the priority of the first HARQ-ACK is used to determine the priority of the first target PUCCH; or a priority of the second target PUCCH.

Optionally, in a case that the second target PUCCH corresponds to at least two priorities, a priority of a first target PUCCH is determined according to a predefined rule.

In this embodiment of this application, if the terminal determines, based on the scheduling information, that retransmission of the historical HARQ-ACK is triggered, and determines that the scheduled second HARQ-ACK of the one or more PDSCHs and/or PDCCHs and the scheduled first HARQ-ACK are fed back within the same time unit, the terminal feeds back the first HARQ-ACK and/or the second HARQ-ACK to the network-side device. Therefore, HARQ-ACK retransmission on a PUCCH resource can be triggered and implemented, it can be ensured that HARQ-ACK retransmission can be effectively implemented, and effectiveness of a communications system can be improved.

The HARQ-ACK transmission apparatus in this embodiment of this application may be an apparatus, or an apparatus or an electronic device with an operating system, or may be a component, an integrated circuit, or a chip in the electronic device. The apparatus or the electronic device may be a terminal, or may be other devices besides the terminal. For example, the mobile terminal may include but is not limited to the foregoing illustrated type of the terminal 11. The nonmobile terminal may be a server, a network attached storage (NAS), a personal computer (PC), a television (TV), a teller machine, a self-service machine, or the like. This is not specifically limited in this embodiment of this application.

The HARQ-ACK transmission apparatus provided in this embodiment of this application can implement each process implemented by the method embodiments in FIG. 2 to FIG. 7, with the same technical effect achieved. To avoid repetition, details are not described herein again.

Figure 10:
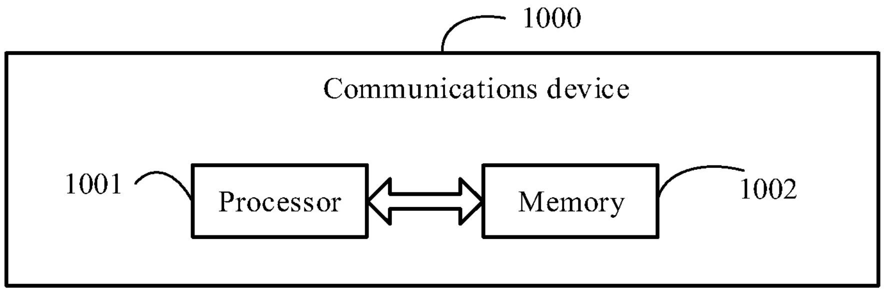
FIG. 10 is a schematic diagram of a structure of a communications device according to an embodiment of this application.

Optionally, FIG. 10 is a schematic diagram of a structure of a communications device according to an embodiment of this application. As shown in FIG. 10, an embodiment of this application further provides a communications device 1000, including a processor 1001, a memory 1002, and a program or instructions stored in the memory 1002 and executable on the processor 1001. For example, when the communications device 1000 is a terminal, and the program or instructions are executed by the processor 1001, each process of the foregoing embodiment of the HARQ-ACK transmission method is implemented, with the same technical effect achieved. When the communications device 1000 is a network-side device, and the program or instructions are executed by the processor 1001, each process of the foregoing embodiment of the HARQ-ACK transmission method is implemented, with the same technical effect achieved. To avoid repetition, details are not described herein again.

An embodiment of this application further provides a terminal, including a processor and a communications interface. The communications interface is configured to receive scheduling information sent by a network-side device.

The processor is configured to: in a case that the terminal determines, based on the scheduling information, that a first HARQ-ACK is triggered and that a second HARQ-ACK and the first HARQ-ACK are fed back within a same time unit, feed back, by the terminal, the first HARQ-ACK and/or the second HARQ-ACK to the network-side device, where the second HARQ-ACK is a first feedback of a HARQ-ACK of one or more PDSCHs and/or PDCCHs, and the first HARQ-ACK includes retransmission of a historical HARQ-ACK.

Figure 11:
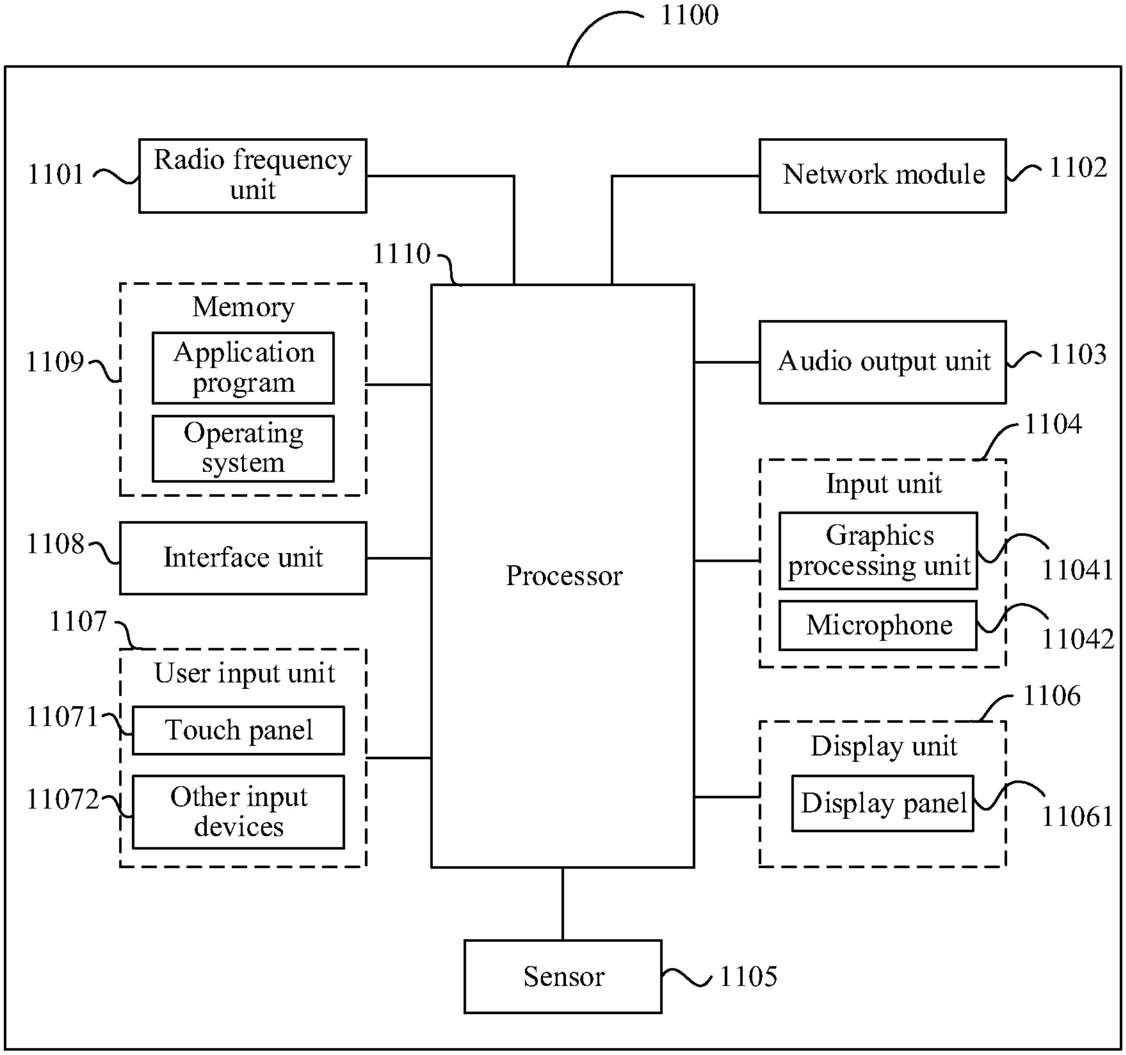
FIG. 11 is a schematic diagram of a hardware structure of a terminal for implementing an embodiment of this application.

The terminal embodiment corresponds to the foregoing terminal-side method embodiment, and each implementation process and implementation of the foregoing method embodiment can be applied to the terminal embodiment, with the same technical effect achieved. Specifically, FIG. 11 is a schematic diagram of a hardware structure of a terminal for implementing an embodiment of this application.

The terminal 1100 includes but is not limited to at least some components such as a radio frequency unit 1101, a network module 1102, an audio output unit 1103, an input unit 1104, a sensor 1105, a display unit 1106, a user input unit 1107, an interface unit 1108, a memory 1109, and a processor 1110.

A person skilled in the art may understand that the terminal 1100 may further include a power supply (for example, a battery) supplying power to all components. Optionally, the power supply may be logically connected to the processor 1110 through a power management system. In this way, functions such as charge management, discharge management, and power consumption management are implemented by using the power management system. The terminal structure shown in FIG. 11 does not constitute a limitation on the terminal. The terminal may include more or fewer components than those shown in the figure, or some components are combined, or component arrangements are different. Details are not described herein again.

It should be understood that, in this embodiment of this application, the input unit 1104 may include a graphics processing unit (GPU) 11041 and a microphone 11042. The graphics processing unit 11041 processes image data of a still picture or video obtained by an image capture apparatus (such as a camera) in a video capture mode or an image capture mode. The display unit 1106 may include a display panel 11061, and the display panel 11061 may be configured in a form of a liquid crystal display, an organic light-emitting diode, or the like. The user input unit 1107 includes a touch panel 11071 and other input devices 11072. The touch panel 11071 is also referred to as a touchscreen. The touch panel 11071 may include two parts: a touch detection apparatus and a touch controller. The other input devices 11072 may include but are not limited to a physical keyboard, a function key (such as a volume control button or a power button), a trackball, a mouse, and a joystick. Details are not described herein again.

In this embodiment of this application, after receiving downlink data from a network-side device, the radio frequency unit 1101 sends the downlink data to the processor 1110 for processing, and in addition, sends uplink data to the network-side device. Generally, the radio frequency unit 1101 includes but is not limited to an antenna, at least one amplifier, a transceiver, a coupler, a low noise amplifier, a duplexer, and the like.

The memory 1109 may be configured to store software programs or instructions and various data. The memory 1109 may primarily include a program or instruction storage area and a data storage area. The program or instruction storage area may store an operating system, an application program or instructions (such as an audio play function and an image play function) required by at least one function, and the like. In addition, the memory 1109 may include a high-speed random access memory, and may further include a non-volatile memory. The non-volatile memory may be a read-only memory (ROM), a programmable read-only memory (PROM), an erasable programmable read-only memory (EPROM), an electrically erasable programmable read-only memory (EEPROM), or a flash memory, for example, at least one disk storage device, a flash memory device, or another non-volatile solid-state storage device.

The processor 1110 may include one or more processing units. Optionally, the processor 1110 may integrate an application processor and a modem processor. The application processor mainly processes the operating system, a user interface, an application program, or an instruction. The modem processor mainly processes wireless communication. For example, the modem processor is a baseband processor. It may be understood that the modem processor may alternatively not be integrated in the processor 1110.

The processor 1110 is configured to:

receive scheduling information sent by a network-side device; and in a case of determining, based on the scheduling information, that a first HARQ-ACK is triggered and that a second HARQ-ACK and the first HARQ-ACK are fed back within a same time unit, feed back the first HARQ-ACK and/or the second HARQ-ACK to the network-side device, where the second HARQ-ACK is a first feedback of a HARQ-ACK of one or more PDSCHs and/or PDCCHs, and the first HARQ-ACK includes retransmission of a historical HARQ-ACK.

In this embodiment of this application, if the terminal determines, based on the scheduling information, that retransmission of the historical HARQ-ACK is triggered, and determines that the scheduled second HARQ-ACK of the one or more PDSCHs and/or PDCCHs and the scheduled first HARQ-ACK are fed back within the same time unit, the terminal feeds back the first HARQ-ACK and/or the second HARQ-ACK to the network-side device. Therefore, HARQ-ACK retransmission on a PUCCH resource can be triggered and implemented, it can be ensured that HARQ-ACK retransmission can be effectively implemented, and effectiveness of a communications system can be improved.

Optionally, the processor 1110 is further configured to:

determine a first target PUCCH for transmitting the first HARQ-ACK and/or the second HARQ-ACK.

Optionally, in a case that the first target PUCCH includes a first PUCCH, the first PUCCH is used to feed back at least one of the first HARQ-ACK or the second HARQ-ACK; and the processor 1110 is further configured to:

concatenate the first HARQ-ACK and the second HARQ-ACK, and send, by the terminal, the first PUCCH to the network-side device, where the first PUCCH includes the concatenated first HARQ-ACK and second HARQ-ACK;

in a case that a first HARQ process includes a second HARQ process, send the first PUCCH to the network-side device, where the first PUCCH includes only the first HARQ-ACK, the first HARQ process is a HARQ process corresponding to the first HARQ-ACK, and the second HARQ process is a HARQ process corresponding to the second HARQ-ACK; and send the first PUCCH to the network-side device only in a case that the first HARQ process includes the second HARQ process.

Optionally, the first target PUCCH includes a second PUCCH and a third PUCCH, where the second PUCCH is used to feed back the first HARQ-ACK, and the third PUCCH is used to feed back the second HARQ-ACK.

Optionally, in a case that the second PUCCH and the third PUCCH have at least one of the following: a same priority, same transmission parameter information, or overlapping transmission resources, the processor 1110 is further configured to:

multiplex the first HARQ-ACK and the second HARQ-ACK on one PUCCH.

Optionally, the first HARQ-ACK is retransmission of the historical HARQ-ACK before the terminal feeds back the first HARQ-ACK and/or the second HARQ-ACK to the network-side device.

Optionally, the scheduling information includes a first information field, and the first information field is used to instruct to trigger retransmission of the historical HARQ-ACK corresponding to a target priority.

Optionally, a priority of the first HARQ-ACK is determined according to a predefined rule.

Optionally, the scheduling information includes a second information field, and the second information field is used to indicate a priority of the first HARQ-ACK.

Optionally, in a case that the scheduling information includes the second information field and does not include the first information field, the target priority is determined according to a predefined rule.

Optionally, in a case that the first information field and the second information field are the same, the priority of the first HARQ-ACK and the target priority are the same.

Optionally, in a case that the first information field and the second information field are the same, the priority of the first HARQ-ACK and the target priority are different.

Optionally, the scheduling information includes a third information field, and the third information field is used to instruct to trigger retransmission of a historical HARQ-ACK corresponding to a second target PUCCH.

Optionally, the scheduling information includes a fourth information field, and the fourth information field is used to indicate a priority of the first HARQ-ACK.

Optionally, in a case that the second target PUCCH corresponds to only one priority, a priority of a first target PUCCH and a priority of the second target PUCCH are the same.

Optionally, in a case that the second target PUCCH corresponds to only one priority, the scheduling information includes a fifth information field, and the fifth information field is used to indicate at least one of:

a priority of a first target PUCCH;

a priority of the first HARQ-ACK, where the priority of the first HARQ-ACK is used to determine the priority of the first target PUCCH; or a priority of the second target PUCCH.

Optionally, in a case that the second target PUCCH corresponds to at least two priorities, a priority of a first target PUCCH is determined according to a predefined rule.

Optionally, a priority of a first target PUCCH is determined based on an indication from the network-side device, determined according to a predefined rule, or determined based on a higher layer configuration.

Optionally, transmission parameter information of a first target PUCCH and transmission parameter information of a fourth PUCCH are the same; and the transmission parameter information includes at least one of the following:

a PUCCH resource index;

start and end positions of transmission;

a symbol length; or transmit power.

Optionally, the processor 1110 is further configured to:

in a case that the first HARQ-ACK is scheduled for the terminal but the second HARQ-ACK that needs to be fed back does not exist or the historical HARQ-ACK does not exist, perform any one of the following:

not feeding back the first HARQ-ACK to the network-side device; and transmitting a default codebook to the network-side device.

In this embodiment of this application, if the terminal determines, based on the scheduling information, that retransmission of the historical HARQ-ACK is triggered, and determines that the scheduled second HARQ-ACK of the one or more PDSCHs and/or PDCCHs and the scheduled first HARQ-ACK are fed back within the same time unit, the terminal feeds back the first HARQ-ACK and/or the second HARQ-ACK to the network-side device. Therefore, HARQ-ACK retransmission on a PUCCH resource can be triggered and implemented, it can be ensured that HARQ-ACK retransmission can be effectively implemented, and effectiveness of a communications system can be improved.

An embodiment of this application further provides a network-side device, including a processor and a communications interface. The communications interface is configured to:

send scheduling information to a terminal, where the scheduling information is used to trigger a first HARQ-ACK, and the first HARQ-ACK includes retransmission of a historical HARQ-ACK; and receive the first HARQ-ACK and/or a second HARQ-ACK, where the first HARQ-ACK and/or the second HARQ-ACK are/is fed back in a case that the terminal determines that the first HARQ-ACK is triggered for retransmission and determines that the second HARQ-ACK and the first HARQ-ACK are fed back within a same time unit, and the second HARQ-ACK is a first feedback of a HARQ-ACK of one or more PDSCHs and/or PDCCHs. The network-side device embodiment corresponds to the foregoing method embodiment of the network-side device, and each implementation process and implementation of the foregoing method embodiment can be applied to the network-side device embodiment, with the same technical effect achieved.

Figure 12:
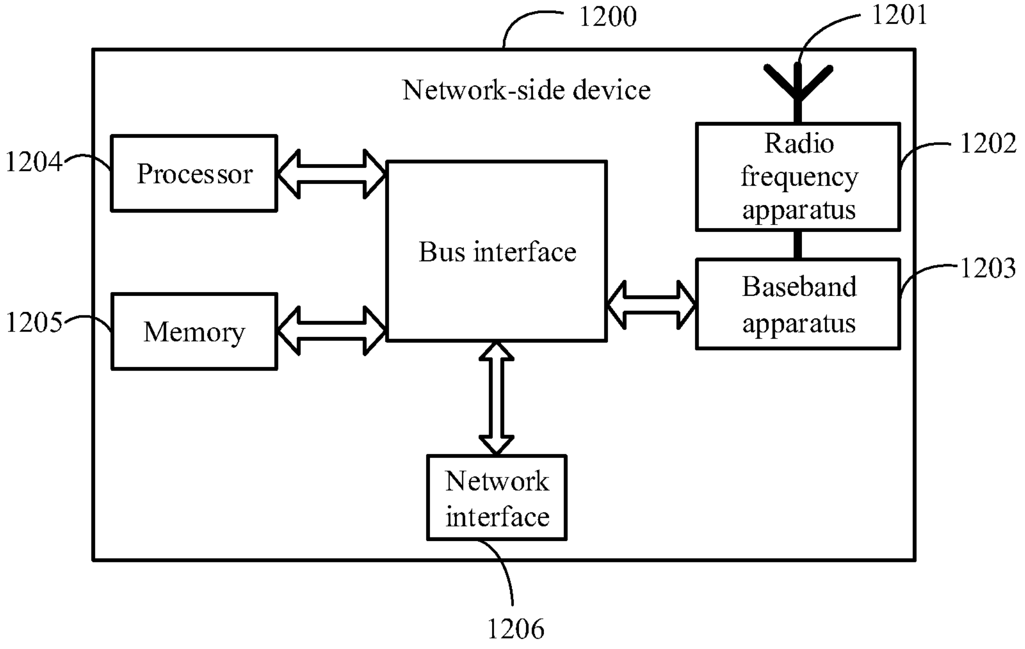
FIG. 12 is a schematic diagram of a hardware structure of a network-side device for implementing an embodiment of this application.

Specifically, an embodiment of this application further provides a network-side device. FIG. 12 is a schematic diagram of a hardware structure of a network-side device for implementing an embodiment of this application. As shown in FIG. 12, the network-side device 1200 includes an antenna 1201, a radio frequency apparatus 1202, and a baseband apparatus 1203. The antenna 1201 is connected to the radio frequency apparatus 1202. In an uplink direction, the radio frequency apparatus 1202 receives information by using the antenna 1201, and sends the received information to the baseband apparatus 1203 for processing. In a downlink direction, the baseband apparatus 1203 processes to-be-sent information, and sends the information to the radio frequency apparatus 1202; and the radio frequency apparatus 1202 processes the received information and then sends the information out by using the antenna 1201.

A frequency band processing apparatus may be located in the baseband apparatus 1203. The method performed by the network-side device in the foregoing embodiment may be implemented in the baseband apparatus 1203, and the baseband apparatus 1203 includes a processor 1204 and a memory 1205.

The baseband apparatus 1203 may include, for example, at least one baseband processing unit, where a plurality of chips are disposed on the baseband processing unit. As shown in FIG. 12, one of the chips is, for example, the processor 1204, connected to the memory 1205, to invoke a program in the memory 1205 to perform the operation of the network-side device shown in the foregoing method embodiment.

The baseband apparatus 1203 may further include a network interface 1206, configured to exchange information with the radio frequency apparatus 1202, where the interface is, for example, a common public radio interface (CPRI).

Specifically, the network-side device in this embodiment of this application further includes a program or instructions stored in the memory 1205 and executable on the processor 1204. When the processor 1204 invokes the program or instructions in the memory 1205, the method performed by each module shown in FIG. 9 is performed, with the same technical effect achieved. To avoid repetition, details are not described herein again.

The processor 1204 is configured to:

send scheduling information to a terminal, where the scheduling information is used to trigger a first HARQ-ACK, and the first HARQ-ACK includes retransmission of a historical HARQ-ACK; and receive the first HARQ-ACK and/or a second HARQ-ACK, where the first HARQ-ACK and/or the second HARQ-ACK are/is fed back in a case that the terminal determines that the first HARQ-ACK is triggered for retransmission and determines that the second HARQ-ACK and the first HARQ-ACK are fed back within a same time unit, and the second HARQ-ACK is a first feedback of a HARQ-ACK of one or more PDSCHs and/or PDCCHs.

In this embodiment of this application, if the terminal determines, based on the scheduling information, that retransmission of the historical HARQ-ACK is triggered, and determines that the scheduled second HARQ-ACK of the one or more PDSCHs and/or PDCCHs and the scheduled first HARQ-ACK are fed back within the same time unit, the terminal feeds back the first HARQ-ACK and/or the second HARQ-ACK to the network-side device. Therefore, HARQ-ACK retransmission on a PUCCH resource can be triggered and implemented, it can be ensured that HARQ-ACK retransmission can be effectively implemented, and effectiveness of a communications system can be improved.

Optionally, in a case that a first target PUCCH includes a first PUCCH, the first PUCCH is used to feed back the first HARQ-ACK and the second HARQ-ACK; and the processor 1204 is further configured to perform at least one of the following:

receiving the first PUCCH, where the first PUCCH includes the concatenated first HARQ-ACK and second HARQ-ACK; or in a case that a first HARQ process includes a second HARQ process, receiving the first PUCCH, where the first PUCCH includes only the first HARQ-ACK, the first HARQ process is a HARQ process corresponding to the first HARQ-ACK, and the second HARQ process is a HARQ process corresponding to the second HARQ-ACK.

Optionally, the scheduling information is further used to indicate that a first HARQ process includes a second HARQ process; and the processor 1204 is further configured to perform:

in a case that a first target PUCCH includes a first PUCCH and that the first PUCCH is used to feed back the first HARQ-ACK and the second HARQ-ACK, receiving the first PUCCH, where the first PUCCH is sent by the terminal only in a case that the first HARQ process includes the second HARQ process.

Optionally, the first target PUCCH includes a second PUCCH and a third PUCCH, where the second PUCCH is used to feed back the first HARQ-ACK, and the third PUCCH is used to feed back the second HARQ-ACK.

Optionally, the first HARQ-ACK is retransmission of the historical HARQ-ACK before the network-side device receives the first HARQ-ACK and/or the second HARQ-ACK.

Optionally, the scheduling information includes a first information field, and the first information field is used to instruct to trigger retransmission of the historical HARQ-ACK corresponding to a target priority.

Optionally, a priority of the first HARQ-ACK is determined according to a predefined rule.

Optionally, the scheduling information includes a second information field, and the second information field is used to indicate a priority of the first HARQ-ACK.

Optionally, in a case that the scheduling information includes the second information field and does not include the first information field, the target priority is determined according to a predefined rule.

Optionally, in a case that the first information field and the second information field are the same, the priority of the first HARQ-ACK and the target priority are the same.

Optionally, in a case that the first information field and the second information field are the same, the priority of the first HARQ-ACK and the target priority are different.

Optionally, the scheduling information includes a third information field, and the third information field is used to instruct to trigger retransmission of a historical HARQ-ACK corresponding to a second target PUCCH.

Optionally, the scheduling information includes a fourth information field, and the fourth information field is used to indicate a priority of the first HARQ-ACK.

Optionally, in a case that the second target PUCCH corresponds to only one priority, a priority of a first target PUCCH and a priority of the second target PUCCH are the same.

Optionally, in a case that the second target PUCCH corresponds to only one priority, the scheduling information includes a fifth information field, and the fifth information field is used to indicate at least one of the following:

a priority of a first target PUCCH;

a priority of the first HARQ-ACK, where the priority of the first HARQ-ACK is used to determine the priority of the first target PUCCH; or a priority of the second target PUCCH.

Optionally, in a case that the second target PUCCH corresponds to at least two priorities, a priority of a first target PUCCH is determined according to a predefined rule.

In this embodiment of this application, if the terminal determines, based on the scheduling information, that retransmission of the historical HARQ-ACK is triggered, and determines that the scheduled second HARQ-ACK of the one or more PDSCHs and/or PDCCHs and the scheduled first HARQ-ACK are fed back within the same time unit, the terminal feeds back the first HARQ-ACK and/or the second HARQ-ACK to the network-side device. Therefore, HARQ-ACK retransmission on a PUCCH resource can be triggered and implemented, it can be ensured that HARQ-ACK retransmission can be effectively implemented, and effectiveness of a communications system can be improved.

An embodiment of this application further provides a non-transitory readable storage medium. The non-transitory readable storage medium stores a program or instructions. When the program or instructions are executed by a processor, each process of the foregoing embodiment of the HARQ-ACK transmission method is implemented, with the same technical effect achieved. To avoid repetition, details are not described herein again.

The processor is a processor in the terminal in the foregoing embodiment. The non-transitory readable storage medium includes a non-transitory computer-readable storage medium, for example, a computer read-only memory (ROM), a random access memory (RAM), a magnetic disk, or an optical disc.

In addition, an embodiment of this application provides a chip. The chip includes a processor and a communications interface. The communications interface is coupled to the processor. The processor is configured to run a program or instructions to implement each process of the foregoing embodiment of the HARQ-ACK transmission method, with the same technical effect achieved. To avoid repetition, details are not described herein again.

It should be understood that the chip provided in this embodiment of this application may also be referred to as a system-level chip, a system chip, a chip system, a system-on-chip, or the like.

An embodiment of this application further provides a computer program or program product. The computer program or program product is stored in a non-transitory storage medium. The program or program product is executed by at least one processor to implement each process of the foregoing embodiment of the HARQ-ACK transmission method, with the same technical effect achieved. To avoid repetition, details are not described herein again.

It should be noted that in this specification, the term "comprise", "include", or any of their variants are intended to cover a non-exclusive inclusion, so that a process, a method, an article, or an apparatus that includes a list of elements not only includes those elements but also includes other elements that are not expressly listed, or further includes elements inherent to such process, method, article, or apparatus. In absence of more constraints, an element preceded by "includes a . . . " does not preclude existence of other identical elements in the process, method, article, or apparatus that includes the element. In addition, it should be noted that the scope of the method and apparatus in the implementations of this application is not limited to performing the functions in an order shown or discussed, and may further include performing the functions in a substantially simultaneous manner or in a reverse order depending on the functions used. For example, the method described may be performed in an order different from that described, and various steps may be added, omitted, or combined. In addition, features described with reference to some examples may be combined in other examples.

According to the foregoing description of the implementations, a person skilled in the art may clearly understand that the methods in the foregoing embodiments may be implemented by using software in combination with a necessary general hardware platform, and certainly may alternatively be implemented by using hardware. However, in most cases, the former is a preferred implementation. Based on such an understanding, the technical solutions of this application essentially or the part contributing to the prior art may be implemented in a form of a computer software product. The computer software product is stored in a storage medium (such as a ROM/RAM, a magnetic disk, or an optical disc), and includes several instructions for instructing a terminal (which may be a mobile phone, a computer, a server, a network device, or the like) to perform the methods described in the embodiments of this application.

The foregoing describes the embodiments of this application with reference to the accompanying drawings. However, this application is not limited to the foregoing specific embodiments. The foregoing specific embodiments are merely illustrative rather than restrictive. Inspired by this application, a person of ordinary skill in the art may develop many other manners without departing from principles of this application and the protection scope of the claims, and all such manners fall within the protection scope of this application.

What is claimed is:

1. A hybrid automatic repeat request acknowledgement (HARQ-ACK) transmission method, comprising:

receiving, by a terminal, scheduling information sent by a network-side device; and in a case that the terminal determines, based on the scheduling information, that a first HARQ-ACK is triggered and that a second HARQ-ACK and the first HARQ-ACK are fed back within a same time unit, feeding back, by the terminal, the first HARQ-ACK and/or the second HARQ-ACK to the network-side device, wherein the second HARQ-ACK is a first feedback of a HARQ-ACK of one or more physical downlink shared channels (PDSCHs) and/or physical downlink control channels (PDCCHs), and the first HARQ-ACK comprises retransmission of a historical HARQ-ACK; wherein the scheduling information is used to trigger retransmission of the historical HARQ-ACK corresponding to a target priority and comprises a second information field, and the second information field is used to indicate a priority of the first HARQ-ACK, wherein the priority of the first HARQ-ACK and the target priority are the same.

2. The HARQ-ACK transmission method according to claim 1, wherein the feeding back, by the terminal, the first HARQ-ACK and the second HARQ-ACK to the network-side device comprises:

determining a first target physical uplink control channel (PUCCH) for transmitting the first HARQ-ACK and/or the second HARQ-ACK.

3. The HARQ-ACK transmission method according to claim 2, wherein in a case that the first target PUCCH comprises a first PUCCH, the first PUCCH is used to feed back at least one of the first HARQ-ACK or the second HARQ-ACK; and the feeding back, by the terminal, the first HARQ-ACK and the second HARQ-ACK to the network-side device comprises at least one of the following:

concatenating, by the terminal, the first HARQ-ACK and the second HARQ-ACK, and sending, by the terminal, the first PUCCH to the network-side device, wherein the first PUCCH comprises the concatenated first HARQ-ACK and second HARQ-ACK;

in a case that a first HARQ process comprises a second HARQ process, sending, by the terminal, the first PUCCH to the network-side device, wherein the first PUCCH comprises only the first HARQ-ACK, the first HARQ process is a HARQ process corresponding to the first HARQ-ACK, and the second HARQ process is a HARQ process corresponding to the second HARQ-ACK; or sending, by the terminal, the first PUCCH to the network-side device only in a case that the first HARQ process comprises the second HARQ process.

4. The HARQ-ACK transmission method according to claim 2, wherein the first target PUCCH comprises a second PUCCH and a third PUCCH, wherein the second PUCCH is used to feed back the first HARQ-ACK, and the third PUCCH is used to feed back the second HARQ-ACK.

5. The HARQ-ACK transmission method according to claim 4, wherein in a case that the second PUCCH and the third PUCCH have at least one of the following: a same priority, same transmission parameter information, or overlapping transmission resources, the feeding back, by the terminal, the first HARQ-ACK and the second HARQ-ACK to the network-side device comprises:

multiplexing, by the terminal, the first HARQ-ACK and the second HARQ-ACK on one PUCCH.

6. The HARQ-ACK transmission method according to claim 1, wherein the first HARQ-ACK is retransmission of the historical HARQ-ACK before the terminal feeds back the first HARQ-ACK and the second HARQ-ACK to the network-side device.

7. The HARQ-ACK transmission method according to claim 6, wherein the scheduling information comprises a third information field, and the third information field is used to instruct to trigger retransmission of a historical HARQ-ACK corresponding to a second target PUCCH.

8. The HARQ-ACK transmission method according to claim 7, wherein the scheduling information comprises a fourth information field, and the fourth information field is used to indicate a priority of the first HARQ-ACK.

9. The HARQ-ACK transmission method according to claim 7, wherein in a case that the second target PUCCH corresponds to only one priority, the scheduling information comprises a fifth information field, and the fifth information field is used to indicate at least one of the following:

a priority of a first target PUCCH;

a priority of the first HARQ-ACK, wherein the priority of the first HARQ-ACK is used to determine the priority of the first target PUCCH; or a priority of the second target PUCCH.

10. The HARQ-ACK transmission method according to claim 1, wherein the method further comprises:

in a case that the first HARQ-ACK is scheduled for the terminal but the second HARQ-ACK that needs to be fed back does not exist or the historical HARQ-ACK does not exist, performing any one of the following:

not feeding back the first HARQ-ACK to the network-side device; and transmitting a default codebook to the network-side device.

11. A hybrid automatic repeat request acknowledgement (HARQ-ACK) transmission method, comprising:

sending, by a network-side device, scheduling information to a terminal, wherein the scheduling information is used to trigger a first HARQ-ACK, and the first HARQ-ACK comprises retransmission of a historical HARQ-ACK; and receiving, by the network-side device, the first HARQ-ACK and/or a second HARQ-ACK, wherein the first HARQ-ACK and/or the second HARQ-ACK are/is fed back in a case that the terminal determines that the first HARQ-ACK is triggered for retransmission and determines that the second HARQ-ACK and the first HARQ-ACK are fed back within a same time unit, and the second HARQ-ACK is a first feedback of a HARQ-ACK of one or more physical downlink shared channels (PDSCHs) and/or physical downlink control channels (PDCCHs); wherein the scheduling information is further used to trigger retransmission of the historical HARQ-ACK corresponding to a target priority and comprises a second information field, and the second information field is used to indicate a priority of the first HARQ-ACK, wherein the priority of the first HARQ-ACK and the target priority are the same.

12. The HARQ-ACK transmission method according to claim 11, wherein in a case that a first target PUCCH comprises a first physical uplink control channel (PUCCH), the first PUCCH is used to feed back the first HARQ-ACK and the second HARQ-ACK; and the receiving the first HARQ-ACK and a second HARQ-ACK comprises at least one of the following:

receiving the first PUCCH, wherein the first PUCCH comprises the concatenated first HARQ-ACK and second HARQ-ACK; or in a case that a first HARQ process comprises a second HARQ process, receiving the first PUCCH, wherein the first PUCCH comprises only the first HARQ-ACK, the first HARQ process is a HARQ process corresponding to the first HARQ-ACK, and the second HARQ process is a HARQ process corresponding to the second HARQ-ACK.

13. The HARQ-ACK transmission method according to claim 11, wherein a first target PUCCH comprises a second PUCCH and a third PUCCH, wherein the second PUCCH is used to feed back the first HARQ-ACK, and the third PUCCH is used to feed back the second HARQ-ACK.

14. The HARQ-ACK transmission method according to claim 11, wherein the first HARQ-ACK is retransmission of the historical HARQ-ACK before the network-side device receives the first HARQ-ACK and the second HARQ-ACK.

15. The HARQ-ACK transmission method according to claim 14, wherein the scheduling information comprises a third information field, and the third information field is used to instruct to trigger retransmission of a historical HARQ-ACK corresponding to a second target PUCCH.

16. The HARQ-ACK transmission method according to claim 15, wherein the scheduling information comprises a fourth information field, and the fourth information field is used to indicate a priority of the first HARQ-ACK.

17. The HARQ-ACK transmission method according to claim 15, wherein in a case that the second target PUCCH corresponds to only one priority, the scheduling information comprises a fifth information field, and the fifth information field is used to indicate at least one of the following:

a priority of a first target PUCCH;

a priority of the first HARQ-ACK, wherein the priority of the first HARQ-ACK is used to determine the priority of the first target PUCCH; or a priority of the second target PUCCH.

18. A terminal, comprising a processor, a memory, and a program or instructions stored in the memory and executable on the processor, wherein the program or instructions, when executed by the processor, causes the terminal to perform:

receiving scheduling information sent by a network-side device; and in a case that the terminal determines, based on the scheduling information, that a first HARQ-ACK is triggered and that a second HARQ-ACK and the first HARQ-ACK are fed back within a same time unit, feeding back the first HARQ-ACK and/or the second HARQ-ACK to the network-side device, wherein the second HARQ-ACK is a first feedback of a HARQ-ACK of one or more physical downlink shared channels (PDSCHs) and/or physical downlink control channels (PDCCHs), and the first HARQ-ACK comprises retransmission of a historical HARQ-ACK; wherein the scheduling information is used to trigger retransmission of the historical HARQ-ACK corresponding to a target priority and comprises a second information field, and the second information field is used to indicate a priority of the first HARQ-ACK, wherein the priority of the first HARQ-ACK and the target priority are the same.

* * * * *